United States Patent
Hori et al.

(10) Patent No.: US 9,966,610 B2
(45) Date of Patent: May 8, 2018

(54) ELECTRODE FOR FUEL CELL AND METHOD FOR MANUFACTURING SAME

(71) Applicants: TOYOTA JIDOSHA KABUSHIKI KAISHA, Toyota-shi, Aichi (JP); NIPPON STEEL & SUMIKIN CHEMICAL CO., LTD, Tokyo (JP)

(72) Inventors: Mikihiro Hori, Nagoya (JP); Hisao Kato, Nagoya (JP)

(73) Assignees: TOYOTA JIDOSHA KABUSHIKI KAISHA, Toyota-shi, Aichi (JP); NIPPON STEEL & SUMIKIN CHEMICAL CO., LTD, Chiyoda-ku, Tokyo (JP)

(*) Notice: Subject to any disclaimer, the term of this patent is extended or adjusted under 35 U.S.C. 154(b) by 102 days.

(21) Appl. No.: 14/891,167

(22) PCT Filed: May 15, 2014

(86) PCT No.: PCT/JP2014/062984
§ 371 (c)(1),
(2) Date: Nov. 13, 2015

(87) PCT Pub. No.: WO2014/185498
PCT Pub. Date: Nov. 20, 2014

(65) Prior Publication Data
US 2016/0093892 A1    Mar. 31, 2016

(30) Foreign Application Priority Data

May 16, 2013 (JP) .................. 2013-104354

(51) Int. Cl.
| | |
|---|---|
| *H01M 4/90* | (2006.01) |
| *H01M 4/86* | (2006.01) |
| *H01M 4/92* | (2006.01) |
| *H01M 8/10* | (2016.01) |
| *H01M 4/88* | (2006.01) |
| *H01M 8/1018* | (2016.01) |

(52) U.S. Cl.
CPC ....... *H01M 4/9075* (2013.01); *H01M 4/8657* (2013.01); *H01M 4/88* (2013.01);
(Continued)

(58) Field of Classification Search
CPC ............. H01M 4/9075; H01M 4/8828; H01M 4/9083; H01M 4/9657; H01M 4/88;
(Continued)

(56) References Cited

U.S. PATENT DOCUMENTS

| | | | | |
|---|---|---|---|---|
| 2002/0009626 A1* | 1/2002 | Terazono | .................. | B01J 23/42 429/482 |
| 2004/0259725 A1* | 12/2004 | Chondroudis | ........... | B01J 21/18 502/185 |

(Continued)

FOREIGN PATENT DOCUMENTS

| | | | | |
|---|---|---|---|---|
| CN | 1329372 A | | 1/2002 | |
| EP | 2782174 | * | 9/2014 | ............. H01M 4/86 |

(Continued)

OTHER PUBLICATIONS

Ahn, Chi-Yeong et al., "Effects of ionomer content on Pt catalyst/ordered mesoporous carbon support in polymer electrolyte membrane fuel cells", Journal of Power Sources, 2013, vol. 222, pp. 477-482.

*Primary Examiner* — Sarah A. Slifka
*Assistant Examiner* — Aaron J Greso
(74) *Attorney, Agent, or Firm* — Sughrue Mion, PLLC

(57) ABSTRACT

Provided are an electrode for fuel cell including a support with improved durability and capable of suppressing poisoning of catalyst particles by ionomer, and a method for manufacturing the same. The method at least includes: performing heat treatment of a support made of mesoporous carbon having a crystallite diameter Lc at 002 plane that is 1.5 nm or less, at 1,700° C. or more and less than 2,300° C.;

(Continued)

supporting catalyst particles at least inside of the support subjected to the heat treatment; and applying ionomer to the support supporting the catalyst particles for coating.

4 Claims, 17 Drawing Sheets

(52) U.S. Cl.
CPC ....... *H01M 4/8828* (2013.01); *H01M 4/9083* (2013.01); *H01M 4/926* (2013.01); *H01M 8/1018* (2013.01); *H01M 2008/1095* (2013.01); *H01M 2250/20* (2013.01); *Y02T 90/32* (2013.01)

(58) Field of Classification Search
CPC ........ H01M 4/90; H01M 4/96; H01M 8/1018; H01M 8/10; H01M 2250/20; H01M 2008/1095; H01M 4/8657; Y02T 90/32
See application file for complete search history.

(56) References Cited

U.S. PATENT DOCUMENTS

| | | |
|---|---|---|
| 2007/0224479 A1 | 9/2007 | Tadokoro et al. |
| 2011/0058308 A1 | 3/2011 | Nishi et al. |
| 2013/0244137 A1 | 9/2013 | Tada et al. |
| 2014/0199609 A1 | 7/2014 | Iden et al. |
| 2014/0287344 A1 | 9/2014 | Suzue et al. |

FOREIGN PATENT DOCUMENTS

| | | | | |
|---|---|---|---|---|
| EP | 2782174 A1 | | 9/2014 | |
| JP | 2004-071253 | * | 3/2004 | ........... Y02E 60/521 |
| JP | 2004-71253 A | | 3/2004 | |
| JP | 2005-209615 A | | 8/2005 | |
| WO | 2009/075264 A1 | | 6/2009 | |
| WO | 2012/053638 A1 | | 4/2012 | |
| WO | 2012077598 A1 | | 6/2012 | |
| WO | WO 2013/073383 | * | 11/2012 | .............. H01M 8/10 |

* cited by examiner (a)

100%RH    20%RH (b)

E(V vs RHE)

(a)

(b)

(c)

(d)

ELECTRODE FOR FUEL CELL AND METHOD FOR MANUFACTURING SAME

CROSS REFERENCE TO RELATED APPLICATIONS

This application is a National Stage of International Application No. PCT/JP2014/062984 filed May 15, 2014, claiming priority based on Japanese Patent Application No. 2013-104354 filed May 16, 2013, the contents of all of which are incorporated herein by reference in their entirety.

TECHNICAL FIELD

The present invention relates to an electrode for fuel cell, including a support that is made of carbon and supports catalyst particles, and is coated with ionomer, and a method for manufacturing the same.

BACKGROUND ART

Since a polymer electrolyte fuel cell (PEFC) has high power density, operates at low temperatures and hardly emits gas containing harmful substances, such a fuel cell has attracted attention as an energy source for transportation as an alternative to conventional internal-combustion engines.

A PEFC includes a polymer electrolyte membrane, on one face of which an anode is bonded and on the other face of which a cathode is bonded as electrodes. At the anode, hydrogen as fuel is supplied, and at the cathode, oxygen as oxidant is supplied, so that the fuel is oxidized to be protons at the anode and oxygen is reduced to water at the cathode for power generation. The anode and the cathode include electrode catalyst for fuel cell that is fine powder, in which a support made of carbon or the like supports catalyst particles made of noble metal such as Pt. In the electrodes for fuel cell serving as an anode and a cathode, such electrode catalyst for fuel cell is coated with ionomer that is made of solid polyelectrolyte.

For instance, an electrode for fuel cell has been proposed, including an electrode catalyst for fuel cell having a support made of the mixture of mesoporous carbon and carbon black, and catalyst particles supported on the support, the electrode catalyst for fuel cell being coated with ionomer (see Patent Document 1, for example).

CITATION LIST

Patent Document

Patent Document 1: JP 2004-071253 A

SUMMARY OF INVENTION

Technical Problem

It has been considered that catalyst particles in contact with ionomer can increase its utilization rate more and so improve the performance. However, recent studies show that ionomer in contact with catalyst particles causes poisoning of the catalyst metal in the catalyst particles. Then, in order to avoid the contact between ionomer and catalyst metal, it may be considered that a support encapsulates catalyst particles therein. However, a support (mesoporous carbon and carbon black) as described in Patent Document 1, for example, typically has low durability. When such a support is heat-treated to improve the durability, pores formed in the carbon black support will collapse, and so it is difficult to encapsulate catalyst particles therein.

In view of such a point, the present invention aims to provide an electrode for fuel cell including a support with improved durability and capable of suppressing poisoning of catalyst particles by ionomer, and a method for manufacturing the same.

Solution to Problem

In order to fulfill the object, a method for manufacturing an electrode for fuel cell according to the present invention, at least includes: performing heat treatment of a support made of mesoporous carbon having a crystallite diameter Lc at 002 plane that is 1.5 nm or less, at 1,700° C. or more and less than 2,300° C.; supporting catalyst particles at least inside of the support subjected to the heat treatment; and applying ionomer to the support supporting the catalyst particles for coating.

According to the present invention, the support used includes mesoporous carbon having the crystallite diameter Lc at 002 plane that is 1.5 nm or less, whereby pores (meso-pores) of mesoporous carbon do not collapse by heat treatment even at 1,700° C. or more and less than 2,300° C., and so the durability of mesoporous carbon can be increased. That is, such heat treatment makes the half width of G band of mesoporous carbon making up the support 70 $cm^{-1}$ or less, and so can increase the crystallization of the support sufficiently. Further catalyst particles are supported at least inside (in the meso-pores) of the support subjected to heat treatment, and so molecules of the ionomer applied to the support supporting catalyst particles for coating hardly enter into the pores (in the meso-pores) of the mesoporous carbon, so that this can suppress contact of ionomer inside of the support with the catalyst particles.

If the crystallite diameter Lc at 002 plane exceeds 1.5 nm, pores of mesoporous carbon will collapse during the heat treatment as stated above, and so catalyst particles cannot be supported at least inside (in the meso-pores) of the support subjected to heat treatment in some cases. As a result, when the support supporting catalyst particles is coated with ionomer, the coverage by ionomer of the catalyst particles increases, and so the catalyst particles get poisoning by the ionomer more. If the heat treatment is performed at a temperature less than 1,700° C., half width of G band of the mesoporous carbon making up the support exceeds 70 $cm^{-1}$ in some cases, which means that crystallization of the support is not enough and so the durability may deteriorate. If the heat treatment is performed at a temperature of 2,300° C. or more, enough pores of the mesoporous carbon cannot be obtained during the heat treatment in some cases.

In another preferable embodiment, the heat treatment is performed so that meso-pores having a size of 2 to 10 nm in the support has a specific surface area of meso-pores that is 400 $m^2$/g or more. Such heat treatment allows the half width of G band of mesoporous carbon making up the support to be 70 $cm^{-1}$ or less and facilitates to support catalyst particles at least inside (in the meso-pores) of the support.

If the specific surface area of meso-pores having a size of 2 to 10 nm in the support is less than 400 $m^2$/g, the support subjected to heat treatment may fail to support catalyst particles at least inside thereof (in the meso-pores) in some cases. Further, the ionomer can be applied for coating so that the coverage by ionomer of the total surface area of the entire catalyst particles supported on the support is 72% or less. This can suppress poisoning of catalyst particles by ionomer while improving the specific activity of the electrode for fuel cell obtained.

In another preferable embodiment, the method for manufacturing an electrode for fuel cell further includes, after supporting the catalyst particles and before applying the ionomer for coating, performing oxidation treatment of at least a surface of meso-pores of mesoporous carbon of the support.

According to this embodiment, oxidation treatment is performed to at least the surface of meso-pores of the mesoporous carbon of the support supporting catalyst particles, whereby oxygen is given to this surface to have hydrophilic nature. This makes the surface of meso-pores adsorb water more, and protons ($H^+$) flowing from ionomer easily reach the catalyst particles in the support. As a result, deterioration of power-generation performance of the fuel cell can be suppressed.

In still another preferable embodiment, the oxidation treatment is performed so that oxygen content per unit area contained in a surface of supported catalyst where the catalyst particles are supported on the support is 0.08 mg/m$^2$ or more. The experiment by the present inventors described later shows that the oxygen content satisfying the range as stated above can suppress decrease of power-generation performance of the fuel cell under low humidified environment. It cannot be said that, if the oxygen content is less than 0.08 mg/m$^2$, the hydrophilic nature obtained is sufficient on the surface of meso-pores, and so it may be difficult for protons from ionomer to reach catalyst particles under the low humidified environment in some cases.

In a further preferable embodiment, when the supported catalyst subjected to the oxidation treatment is placed under vacuum environment, and when water vapor partial pressure is increased to a vicinity of a saturated water vapor pressure so as to let water vapor adsorbed to the supported catalyst, and when water vapor partial pressure is decreased from a vicinity of the saturated water vapor pressure while letting water vapor adsorbed to the supported catalyst so as to let water vapor adsorbed to the supported catalyst desorb, let that T1 denotes mass of water vapor adsorbed to the supported catalyst when the water vapor partial pressure is increased to be 60% of the saturated water vapor pressure and T2 denotes mass of water vapor adsorbed to the supported catalyst when the water vapor partial pressure is decreased to be 60% of the saturated water vapor pressure, the oxidation treatment is performed to the supported catalyst so that a relationship of T1/T2≥0.15 is satisfied.

According to this embodiment, as the water vapor partial pressure is increased to the vicinity of the saturated water vapor pressure, the amount of water vapor adsorbed to the supported catalyst increases, and as the water vapor partial pressure is decreased from the vicinity of the saturated water vapor pressure in this state, water vapor adsorbed to the supported catalyst desorbs. At this time, the mass T1 of water vapor adsorbed to the supported catalyst when the water vapor partial pressure is increased to be 60% of the saturated water vapor pressure and the mass T2 of water vapor adsorbed to the supported catalyst when the water vapor partial pressure is decreased to be 60% of the saturated water vapor pressure are different values even at the same water vapor partial pressure. That is, once water vapor (water) enters into meso-pores and is adsorbed to the surface of meso-pores, such water vapor is difficult to leave from the meso-pores, so that T1<T2 as stated above holds. Herein, a larger value of T1/T2 (specifically approaching 1) means higher drainage performance of meso-pores.

In this embodiment, the surface of meso-pores is oxidized so that T1/T2≥0.15, whereby the size of meso-pores is enlarged and drainage performance of water adsorbed to the meso-pores is increased. This allows water inside of the meso-pores to be drained easily even under excessively humidified atmosphere, so that oxygen gas becomes easily diffused from the inside of meso-pores toward the catalyst particles. As a result, deterioration of power-generation performance of the fuel cell can be suppressed even under excessively humidified atmosphere.

In a preferable embodiment, in the oxidation treatment, nitric acid aqueous solution that is 0.1 mol/L or more and is heated to be 60° C. or higher is brought into contact with at least the surface of the meso-pores of the mesoporous carbon for 1 hour or more. As is obvious also from the experiment by present inventors described later, this can suppress deterioration of power-generation performance of the fuel cell under low humidified environment and excessively humidified atmosphere for the same reason as stated above.

The present application discloses an electrode for fuel cell as well, as the invention. An electrode for fuel cell according to the present invention includes: a support made of mesoporous carbon; catalyst particles supported at least inside of the support; and ionomer with which the support is coated. The mesoporous carbon making up the support has half width of G band that is 70 cm$^{-1}$ or less.

According to the present invention, since the mesoporous carbon has half width of G band that is 70 cm$^{-1}$ or less, the mesoporous carbon can have increased durability. On the other hand, if the half width of G band of the mesoporous carbon making up the support exceeds 70 cm$^{-1}$, crystallization of the support is not enough and so the durability may deteriorate.

In a preferable embodiment, coverage by the ionomer of a total surface area of the entire catalyst particles supported on the support is more than 0% and 72% or less. This embodiment can suppress poisoning of catalyst particles by ionomer while improving the specific activity of the electrode for fuel cell obtained.

In another preferable embodiment, before applying the ionomer to the support for coating, oxygen content per unit area contained in a surface of supported catalyst where the catalyst particles are supported on the support is 0.08 mg/m$^2$ or more.

According to this embodiment, since the oxygen content satisfies the range as stated above, decrease of power-generation performance of the fuel cell can be suppressed under low humidified environment. If the oxygen content is less than 0.08 mg/m$^2$, the hydrophilic nature obtained is sufficient on the surface of meso-pores, and so it may be difficult for protons from ionomer to reach catalyst particles under the low humidified environment in some cases.

In still another preferable embodiment, when the supported catalyst before applying the ionomer to the support for coating is placed under vacuum environment, and when water vapor partial pressure is increased to a vicinity of a saturated water vapor pressure so as to let water vapor adsorbed to the supported catalyst, and when water vapor partial pressure is decreased from a vicinity of the saturated water vapor pressure while letting water vapor adsorbed to the supported catalyst so as to let water vapor adsorbed to the supported catalyst desorb, let that T1 denotes mass of water vapor adsorbed to the supported catalyst when the water vapor partial pressure is increased to be 60% of the saturated water vapor pressure and T2 denotes mass of water vapor adsorbed to the supported catalyst when the water vapor partial pressure is decreased to be 60% of the saturated water vapor pressure, the supported catalyst satisfies a relationship of T1/T2≥0.15.

According to this embodiment, since the relationship of T1/T2≥0.15 is satisfied, drainage performance of water (water vapor) adsorbed to the meso-pores is increased. This allows water inside of the meso-pores to be drained easily even under excessively humidified atmosphere, so that oxygen gas becomes easily diffused from the inside of meso-pores toward the catalyst particles. As a result, deterioration of power-generation performance of the fuel cell can be suppressed even under excessively humidified atmosphere.

Advantageous Effects of Invention

According to the present invention, durability of the support can be increased, and poisoning of catalyst particles by ionomer can be suppressed.

DESCRIPTION OF EMBODIMENTS

The following describes a method for manufacturing an electrode for fuel cell according to one embodiment of the present invention.

Figure 1:
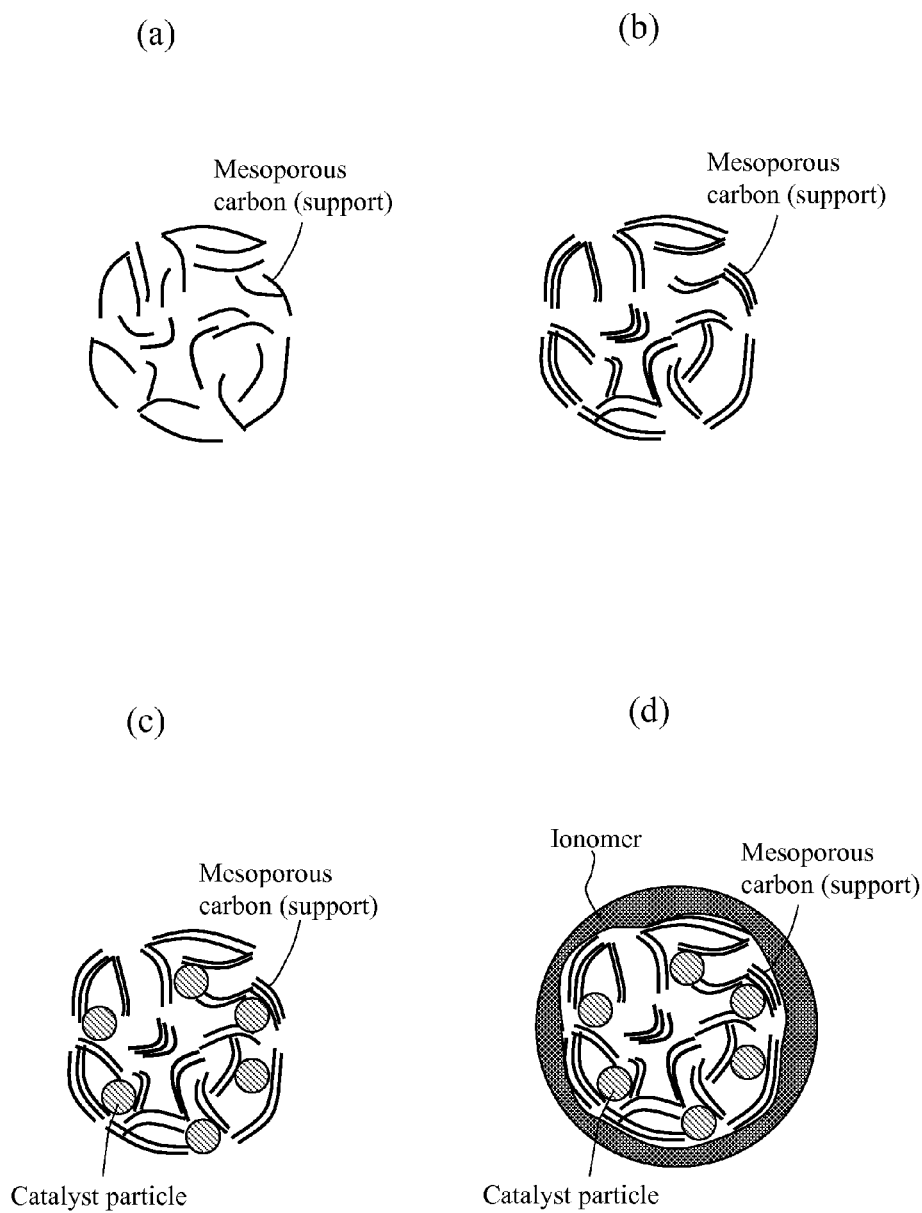
FIG. 1 is a schematic view to explain a method for manufacturing an electrode for fuel cell according to the present invention, wherein (a) illustrates a support made of mesoporous carbon, (b) illustrates a support after heat treatment, (c) illustrates a support supporting catalyst particles, and (d) illustrates an electrode for fuel cell, in which a support supporting catalyst particles is coated with ionomer.

FIG. 1 is a schematic view to explain a method for manufacturing an electrode for fuel cell according to the present invention, wherein (a) illustrates a support made of mesoporous carbon, (b) illustrates a support after heat treatment, (c) illustrates a support supporting catalyst particles, and (d) illustrates an electrode for fuel cell, in which a support supporting catalyst particles is coated with ionomer.

Firstly as a support according to the present embodiment, a support made of mesoporous carbon having a crystallite diameter Lc at 002 plane that is 1.5 nm or less is prepared (see FIG. 1(a)). Specifically in mesoporous carbon of 1.5 nm or less, a porous wall forming meso-pores (pores) of mesoporous carbon includes a few layers of graphene sheets that are stacked in the wall thickness direction. "Graphene" is the arrangement of carbon atoms in a hexagonal net shape, which corresponds to a single layer of graphite. Herein when two layers of graphene sheets are stacked, the crystallite diameter Lc at 002 plane will be 0.34 nm, and so it is preferable that the crystallite diameter Lc at 002 plane of mesoporous carbon making up the support of the present embodiment is 0.34 nm or more.

For instance, such a support preferably has specific surface area of meso-pores that is 800 $m^2$/g or more, and a pore size of the meso-pores that is 2 nm to 10 nm. Further, considering gas permeability, a rod-shaped or circular body containing carbon preferably has a three-dimensional structure, and the rod-shaped or circular body preferably extends three-dimensionally and couples mutually to form a network so as to have a so-called dendritic (tree-like) structure.

Such a support may be manufactured by a method including: blowing acetylene gas into ammonia aqueous solution of silver nitrate while in-liquid irradiating with ultrasonic waves to produce a precipitate of silver acetylide in the solution. Next, the precipitate is placed in a vacuum electric furnace or a vacuum high-temperature tank, to which heat treatment is performed at a temperature of 60° C. to 80° C. for 12 hours or more, for example, to let silver acetylide segregate, whereby a metal-encapsulated dendritic nanostructure encapsulating metal silver particles therein is prepared.

Next, heat treatment is performed to the metal-encapsulated dendritic nanostructure at 160° C. to 200° C. for 10 minutes to 30 minutes, so as to cause explosion in nano-scale of the remaining silver acetylide, and let silver encapsulated in the metal-encapsulated dendritic nanostructure blow off to the outside. Then, the carbon nanostructure is dissolved for washing to remove silver and other instable carbon compounds left on the surface, whereby a support made of mesoporous carbon as stated above can be obtained. The support is configured so that carbon particles making up the support, e.g., graphene small cells, are enclosed by the superficial skin that is also made of graphene.

Herein "crystallite diameter Lc at 002 plane that is 1.5 nm or less" is a value obtained through an analysis by powder X-ray diffractometry using CuKα ray. Powder-form electrode catalyst body is analyzed by powder X-ray diffractometry, and a half width β (radian) of a diffraction peak at each crystal plane is obtained from the thus obtained diffraction pattern. Then, the average L (nm) of crystallite diameter of the support is calculated based on the Scherrer's formula: $L=K\lambda/\beta \cos\theta$. Herein the constant K (form factor) is 0.89, λ, denotes the wavelength of X ray (Å), and θ denotes diffraction angle (°). Note here that the peak at 002 plane appearing around the θ diffraction angle of 26° originates from the stacking direction of the carbon hexagonal network structure, which depends on the thickness of a wall face making up meso-pores.

Next, the support made of mesoporous carbon is heat-treated at 1,700° C. or more and less than 2,300° C. Specifically, this treatment yields a support having high crystallinity having the half width of G band of the mesoporous carbon that is 70 $cm^{-1}$ or less (see FIG. 1(b)). Herein, the duration for heating the support is preferably in the range of 30 minutes to 2 hours, and the atmosphere for heat treatment is a non-oxidizing atmosphere preferably. For instance, heat treatment is performed while filling the furnace with inert gas, such as argon gas or helium gas. The heat treatment is preferably performed by setting the heating time and the heating temperature so that meso-pores of the support having a pore size of 2 to 10 nm has a specific surface area of meso-pores that is 400 $m^2/g$ or more. If the pore size of meso-pores exceeds 10 nm, ionomer may enter into the meso-pores because ionomer has a minimum micelle size of about 10 nm. If the pore size of meso-pores is less than 2 nm, catalyst particles such as platinum particles may not enter into the meso-pores, and if catalyst particles enter into there partly, diffusion of reactant ($H^+$, $O_2$) may become slow (diffusion resistance becomes larger), and so the performance deteriorates.

In this way, the support used includes mesoporous carbon having the crystallite diameter Lc at 002 plane that is 1.5 nm or less as stated above, whereby pores (meso-pores) of mesoporous carbon do not collapse by heat treatment even at 1,700° C. or more and less than 2,300° C., and so the durability of mesoporous carbon can be increased.

If the crystallite diameter Lc at 002 plane exceeds 1.5 nm, pores of mesoporous carbon will collapse during the heat treatment as stated above, and so catalyst particles cannot be supported at least inside (in the meso-pores) of the support subjected to heat treatment in some cases. If the heat treatment is performed at a temperature less than 1,700° C., half width of G band of the mesoporous carbon making up the support exceeds 70 $cm^{-1}$ in some cases, which means that crystallization of the support is not enough and so the durability may deteriorate. If the heat treatment is performed at a temperature of 2,300° C. or more, pores of the mesoporous carbon will collapse during the heat treatment, and so enough pores cannot be obtained in some cases.

Note here that the specific surface area of meso-pores of a support (mesoporous carbon) refers to a surface area per unit mass of the support including meso-pores of the mesoporous carbon, and this is analyzed by the DH (Dollimore-Heal) method based on an adsorption curve obtained by introducing nitrogen gas as adsorption gas into a support and letting nitrogen gas adsorbed to the support. In the present invention, pores having pore sizes of 2 to 10 nm are specified, and the surface area formed by these pores (meso-pores) are used as the specific surface area of meso-pores.

Next, catalyst particles are supported at least inside of the support subjected to heat treatment (see FIG. 1(c)). Examples of the catalyst particles include catalyst metal containing platinum, palladium or the like. For instance, when platinum particles are supported, the support as stated above is diffused into pure water, to which nitric acid is added, a predetermined amount of diamminedenitroplatinum acid aqueous solution is added, and then ethanol is further added, followed by heating for reflux (reduction). This allows platinum particles to be supported inside of the mesoporous carbon as the support. The duration from the addition of the diamminedenitroplatinum acid aqueous solution to the reflux is adjusted, whereby the ratio of platinum particles supported inside of the mesoporous carbon can be adjusted. This enables the adjustment of coverage by ionomer of catalyst particles (platinum particles) as described later.

Next, the support supporting catalyst particles is coated with ionomer (see FIG. 1(d)). As the ionomer, perfluoro-proton exchange resin of a fluoroalkyl copolymer that is polymer electrolyte having proton conductivity and has a fluoroalkyl ether side chain and a perfluoroalkyl main chain is preferably used. Examples include Nafion (trademark) manufactured by DuPont, Aciplex (trademark) manufactured by Asahi Kasei Corporation, Flemion (trademark) manufactured by Asahi Glass Co., Ltd., and Gore-Select (trademark) manufactured by Japan Gore-tex Inc. Examples of partially fluorinated resin include a polymer of trifluorostyrene sulfonic acid and polyvinylidene fluoride to which sulfonic acid groups are introduced. A styrene-divinylbenzene copolymer and polyimide resin, which are hydrocarbon proton exchange resins, to which sulfonic acid groups are introduced, are also available.

As a result, the ionomer can be applied for coating so that the coverage by ionomer of the total surface area of the entire catalyst particles supported on the support is more than 0% and 72% or less. This can suppress poisoning of catalyst particles by ionomer while improving the specific activity of the electrode for fuel cell obtained.

Herein, the ionomer coverage can be calculated by finding (1) the surface area of the entire catalyst particles, and (2) the surface area of catalyst particles coated with ionomer. For instance, as illustrated in FIG. 2(a), when the catalyst particles are platinum particles, if ionomer or water is present on the surface of the catalyst particles, they serve as a path of protons ($H^+$) and so protons ($H^+$) on the catalyst particles will be adsorbed.

Accordingly, in the environment of 100% RH, since water is contained in meso-pores inside of the support (mesoporous carbon) in the electrode for fuel cell of the present invention, ionomer and water will serve as a path for protons ($H^+$) irrespective of a contact with ionomer, and so protons ($H^+$) will be adsorbed to all of the catalyst particles. (1) The surface area of the entire catalyst particles therefore can be calculated.

On the other hand, in the environment of 20% RH, water is not contained in meso-pores inside of the support (mesoporous carbon) in the electrode for fuel cell of the present invention, and so protons ($H^+$) will be adsorbed to the surface of catalyst particles that come into contact with ionomer. Then (2) the surface area of catalyst particles coated with ionomer can be calculated. The present inventor confirmed that, when platinum particles are used, the hydrogen adsorption electric quantity shows the lower limit for 30% RH, and that no path for protons ($H^+$) by water is formed for 20% RH.

Figure 2:
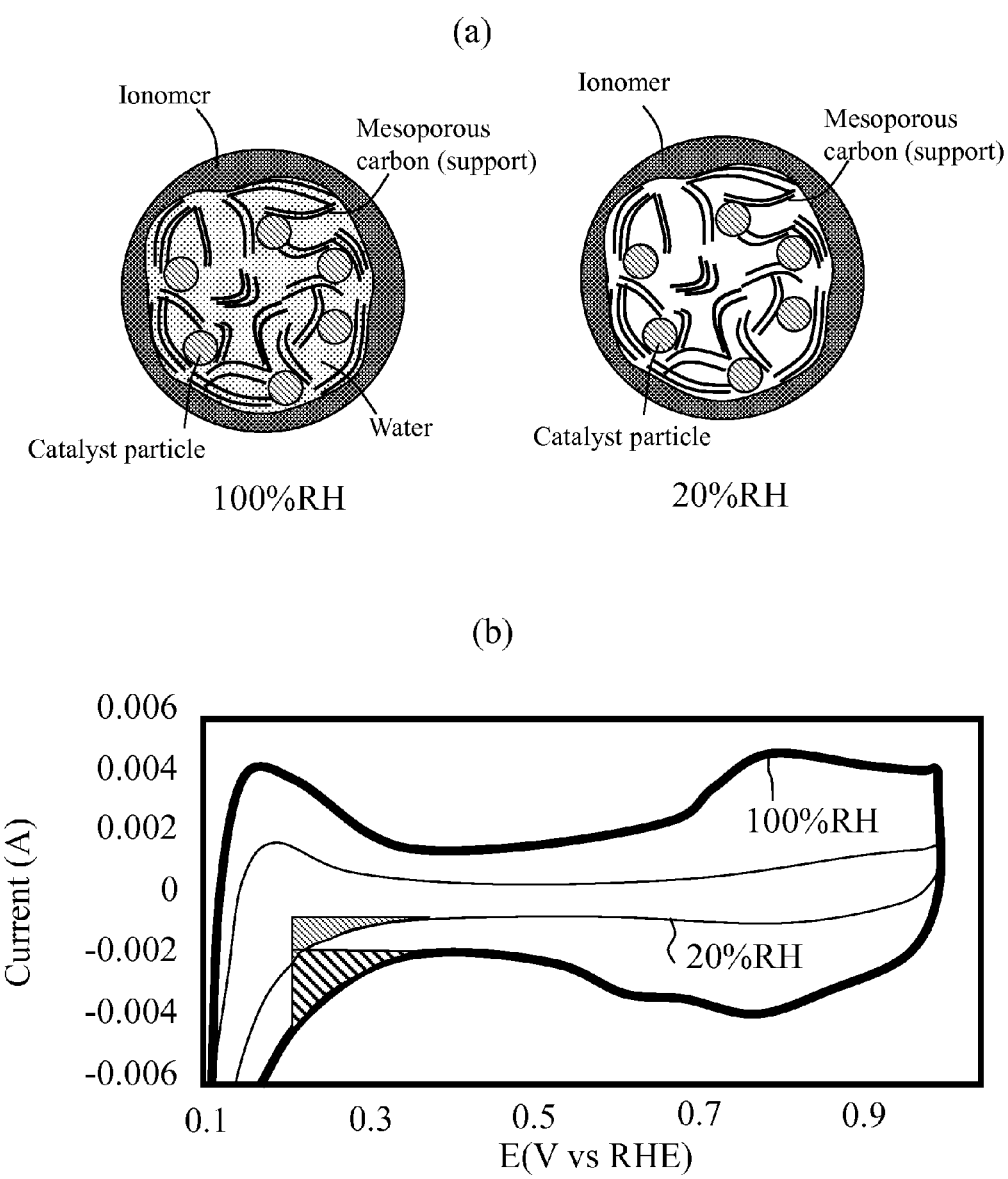
FIG. 2(a) explains the coverage by ionomer of catalyst particles of an electrode for fuel cell according to the present invention, and (b) illustrates a measurement result of the coverage by ionomer of the catalyst particles.

Then as illustrated in FIG. 2(b), when voltage is swept in a predetermined range and at a predetermined rate with reference to a reference electrode (RHE) under the conditions of 100% RH and 20% RH using cyclic voltammetry, the area of the shaded area in FIG. 2(b) shows the hydrogen adsorption electric quantity adsorbed to the catalyst particles. Then, it can be represented as in:

(coverage by ionomer of the total surface area of the entire catalyst particles supported on the support)=(hydrogen adsorption electric quantity at 20% RH)/(hydrogen adsorption electric quantity at 100% RH)×100.

In the case of an electrode for fuel cell of the present embodiment, catalyst particles are supported at least inside (in the meso-pores) of the support subjected to heat treatment, and so even when the support supporting the catalyst particles (supported catalyst) is coated with ionomer, molecules of ionomer hardly enter into the pores (in the meso-pores) of the mesoporous carbon, which then can suppress contact of ionomer inside of the support with the catalyst particles. That is, in the case of the present embodiment, ionomer can be applied for coating so that the coverage by ionomer of the total surface area of the entire catalyst particles supported on the support can be 72% or less, without adjusting the additive amount of ionomer.

Figure 3:
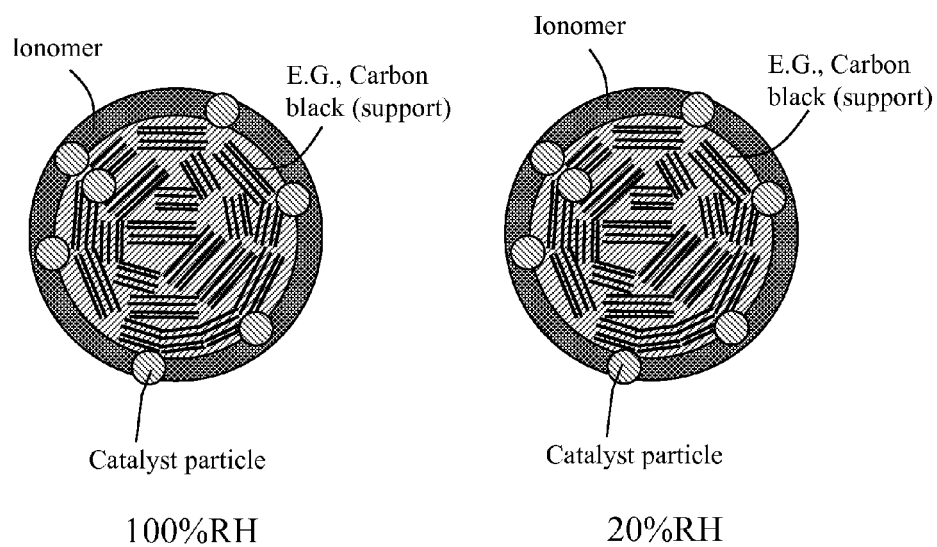
FIG. 3(a) explains the coverage by ionomer of catalyst particles of a conventional electrode for fuel cell, and (b) illustrates a measurement result of the coverage by ionomer of the catalyst particles.
Figure 3:
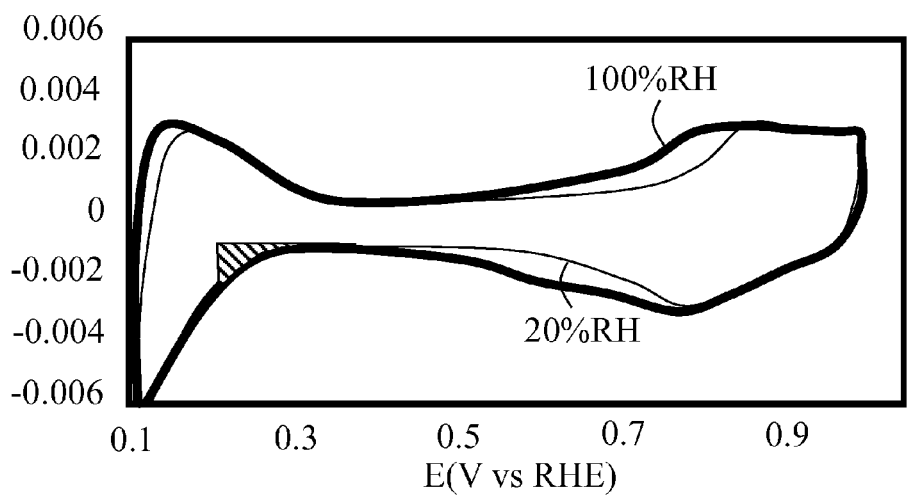

On the other hand, as illustrated in FIG. 3(a), when a conventional support without pores formed therein is used, catalyst particles are not supported while being encapsulated in the support, but are supported on the surface of the support. A path for protons (H+) therefore will be formed by ionomer, and so a path for protons (H+) will not be formed by water in any case of 20% RH and 100% RH.

As a result, as illustrated in FIG. 3(b), the hydrogen adsorption electric quantity is substantially the same between at 20% RH and at 100% RH, and as is obvious from Examples as described later as well, the coverage of catalyst particles by ionomer increases as compared with the present embodiment, that is, catalyst metal will be prone to severely-poisoning by ionomer.

Further since the support used has a crystallite diameter Lc at 002 plane that is 1.5 nm or less (the support having the structure as stated above), collapse of meso-pores hardly occurs, which results from the development of carbon particles, even when the support is heated under the heating conditions as stated above, and the mesoporous carbon making up the support subjected to the heat treatment can keep the crystallite diameter Lc at 002 plane that is 1.5 nm or less. This can achieve the specific surface area of meso-pores having a pore size of the support of 2 to 10 nm that is 400 $m^2/g$ or more while improving the crystallinity of the support (i.e., the half width of G band of the mesoporous carbon is 70 $cm^{-1}$ or less). Note here that the half width of G band of the mesoporous carbon is preferably 40 $cm^{-1}$ or more, and it is difficult to manufacture mesoporous carbon having a value less than this value. The meso-pores having a pore size of 2 to 10 nm has a specific surface area of meso-pores that is 1,100 $m^2/g$ or less, and it is difficult to manufacture mesoporous carbon exceeding this value.

Now the following describes a method for measuring a half width of G band. When monochromatic light such as laser light is applied to a support using a typical Raman spectroscopic device, a spectrum of Raman scattering light having a different wavelength from that of incident light is obtained, and so the structure of the support can be specified based on a difference (Raman shift) in the number of frequency from the incident light of Raman scattering light and the scattering light spectrum (intensity).

Figure 4:
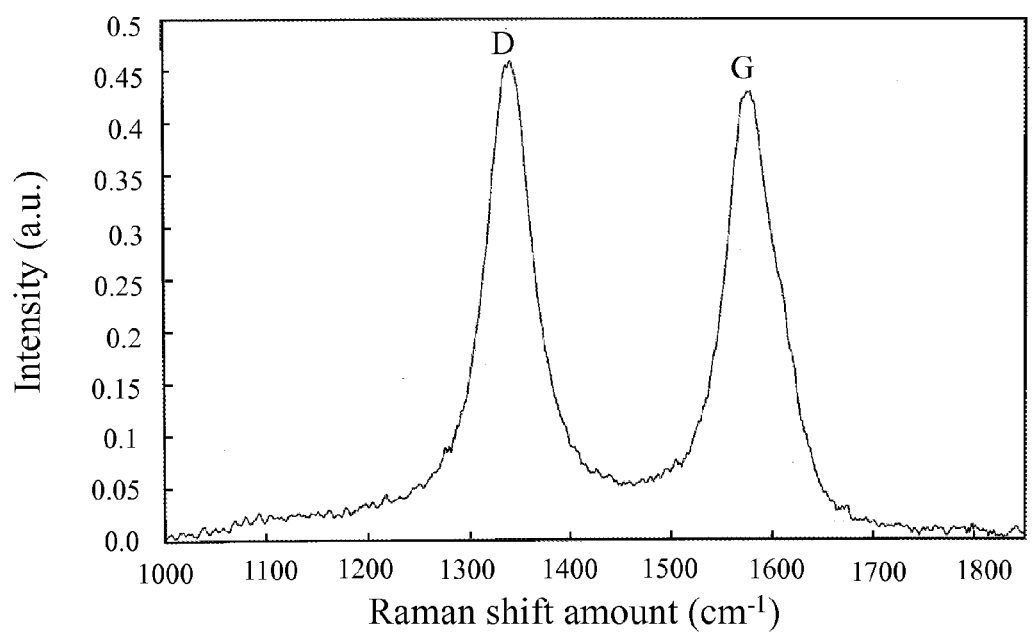
FIG. 4 explains a half width of G band of mesoporous carbon making up the support of the electrode for fuel cell according to the present invention.

Herein when the structure of a support made of a carbon material (mesoporous carbon) is analyzed based on Raman spectroscopic spectra, a peak of the Raman spectroscopic spectrum typically appears at around 1350 $cm^{-1}$ and at around 1580 $cm^{-1}$ of the Raman shift. Then, the "G band" according to the present invention is a peak around 1580 $cm^{-1}$ of the Raman shift, which is a band resulting from the graphite structure. As illustrated in FIG. 4, the half width of G band is a width at a half value of the intensity in G band, and a smaller half width of G band means higher crystallinity of carbon of the support.

Figure 5:
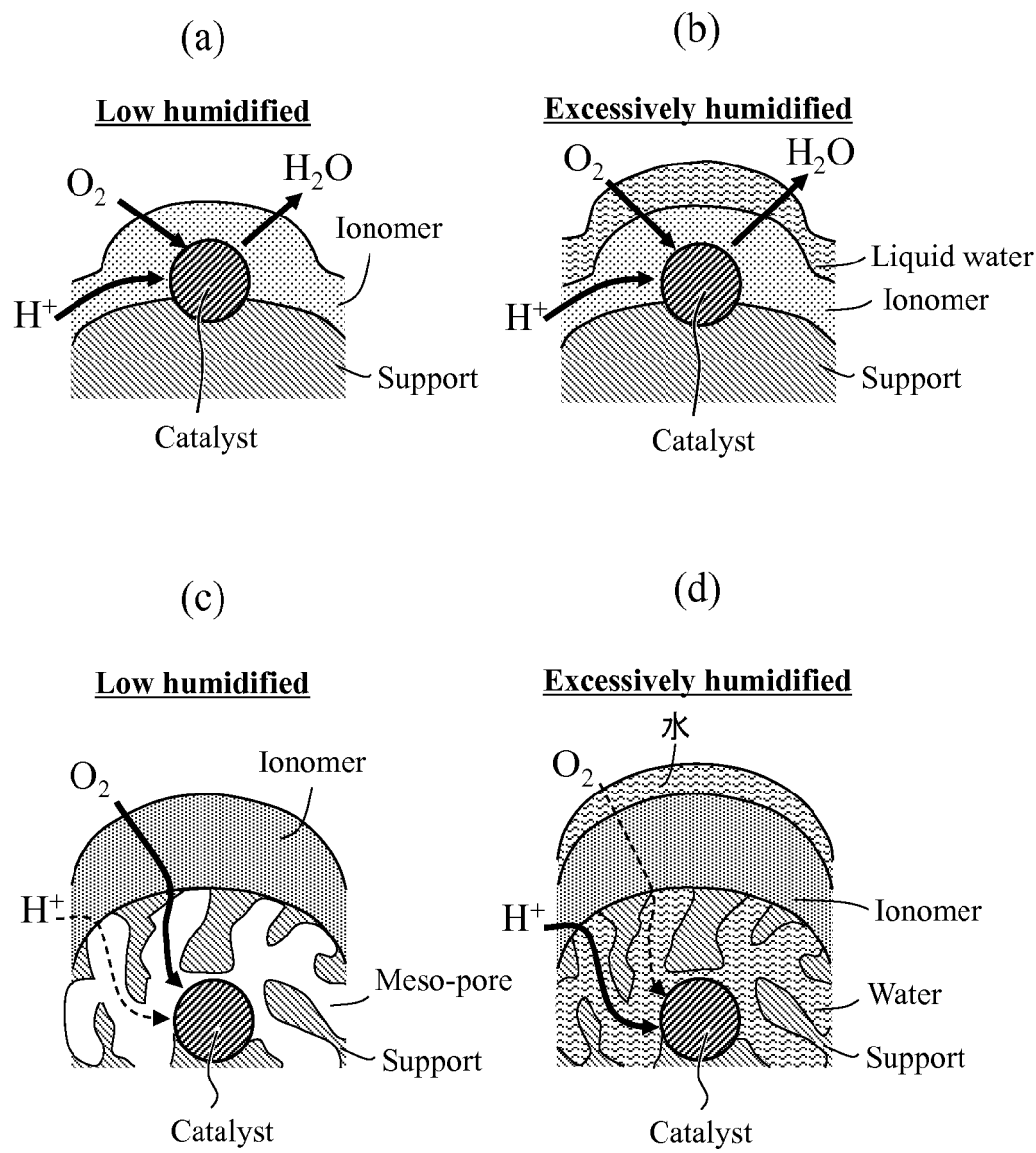
FIG. 5(a) schematically illustrates the usage of a conventional electrode for fuel cell in a low humidified state, (b) schematically illustrates the usage of a conventional electrode for fuel cell in an excessively humidified state, (c) schematically illustrates the usage of the electrode for fuel cell of FIG. 1(d) in a low humidified state, and (d) schematically illustrates the usage of the electrode for fuel cell of FIG. 1(d) in an excessively humidified state FIG. 6(a) schematically illustrates the electrode for fuel cell of FIG. 1(d), (b) schematically illustrates the state where oxidation treatment is performed to the supported catalyst of the electrode for fuel cell in (a), (c) schematically illustrates the usage of the electrode for fuel cell of (b) in a low humidified state, and (d) schematically illustrates the usage of the electrode for fuel cell of (b) in an excessively humidified state.

Meanwhile as illustrated in FIG. 5(a), (b), when catalyst particles are supported on the surface of the support in a conventional way, external oxygen gas and protons ($H^+$) flowing from ionomer undergo reaction on the surface of the catalyst particles so as to generate water in any environment of high humidified environment and low humidified environment. However, since most of the surface of the catalyst particles is coated with ionomer, the catalyst particles get poisoning and so the activity of catalyst is not good.

Then, as illustrated in FIG. 5(c), (d), when catalyst particles are supported inside of the mesoporous carbon as in the embodiment as stated above, poisoning of catalyst particles by ionomer can be suppressed, and so the activity of catalyst particles can be increased. The surface of meso-pores, however, which are made of graphite, has high hydrophobic nature (water-repellency). This results in less adsorption of water on the surface of meso-pores under low humidified environment. Then as illustrated in FIG. 5(c), it becomes difficult for protons ($H^+$) flowing from ionomer to reach the catalyst particles (diffusion resistance of protons becomes larger). This degrades the power-generation performance of the fuel cell under the low humidified environment in some cases.

On the other hand, under excessively humidified environment, when meso-pores are filled with water internally, it becomes difficult for oxygen gas to diffuse toward catalyst particles through the inside of meso-pores (diffusion resistance of oxygen gas becomes larger) as illustrated in FIG. 5(d). This degrades the power-generation performance of the fuel cell under the excessively humidified environment also in some cases.

Then, in the present embodiment, after the step of supporting catalyst particles described in FIG. 1(b) and before the step of applying ionomer for coating described in FIG. 1(c), at least the surface of meso-pores of the mesoporous carbon of the support supporting catalyst particles (i.e., supported catalyst) is oxidized.

Specifically, nitric acid, sulfuric acid, hydrogen peroxide, ozone or the like is brought into contact with the support supporting catalyst particles (supported catalyst) in FIG. 1(b), whereby the surface of the supported catalyst including the surface of meso-pores is oxidized. This oxidation treatment gives functional groups, such as a carbonyl group, a hydroxyl group, or a carboxyl group to the surface of meso-pores so that the surface has hydrophilic nature.

This makes the surface of meso-pores adsorb water more, and protons flowing from ionomer easily reach the catalyst particles inside of the support, and so deterioration of power-generation performance of the fuel cell can be suppressed.

Figure 6:
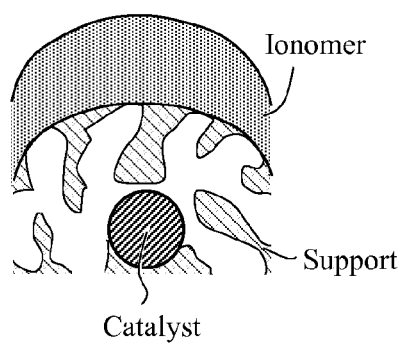
Figure 6:
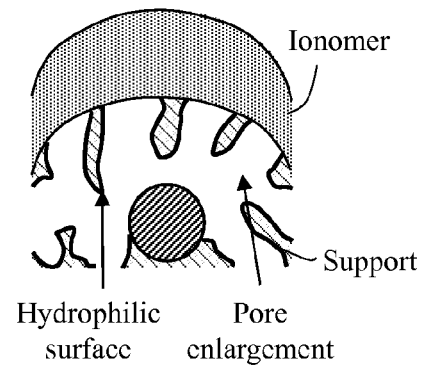
Figure 6:
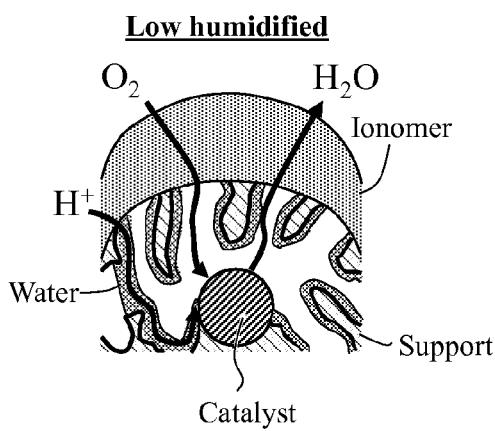
Figure 6:
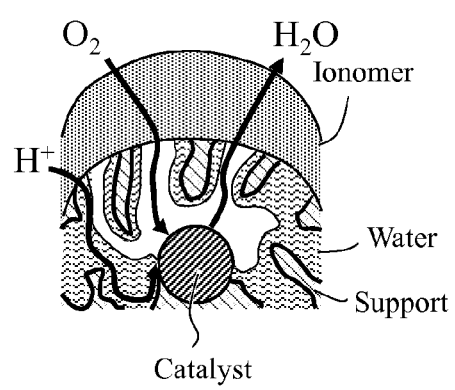

Especially oxidation treatment is preferably performed so that the oxygen content per unit area contained in the surface of the supported catalyst that is a support supporting catalyst particles is 0.08 mg/m² or more. As a result, as illustrated in FIG. 6(c), even under low humidified environment, protons flowing from ionomer are allowed to reach the catalyst particles via water adsorbed to the surface of meso-pores more reliably. As a result, deterioration of power-generation performance of the fuel cell can be suppressed under the low humidified environment. It cannot be said from the experiment described later that, if the oxygen content is less than 0.08 mg/m², the hydrophilic nature obtained on the surface of meso-pores is sufficient, and so it may be difficult for protons from ionomer to reach catalyst particles under the low humidified environment in some cases. This oxygen content is preferably 0.2 mg/m² or less. It may be difficult to let the surface of a supported catalyst contain oxygen exceeding this value.

Herein under the excessively humidified environment, the size of meso-pores is enlarged by oxidation treatment, whereby water in the meso-pores can be drained. However, such drainage performance depends on the degree of hydrophilic nature of meso-pores and the shape of meso-pores as well, and so the drainage performance cannot be specified simply by the size of the meso-pores.

Figure 7:
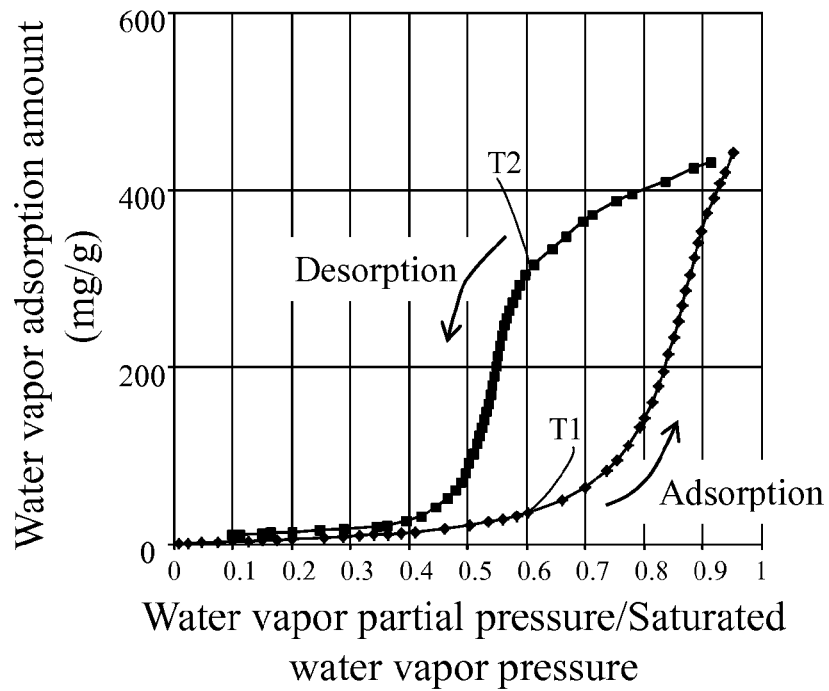
FIG. 7(a) explains a change in water vapor partial pressure and in adsorption of water vapor to the supported catalyst, and (b) illustrates the relationship between the water vapor partial pressure and the water vapor adsorption amount ratio.
Figure 7:
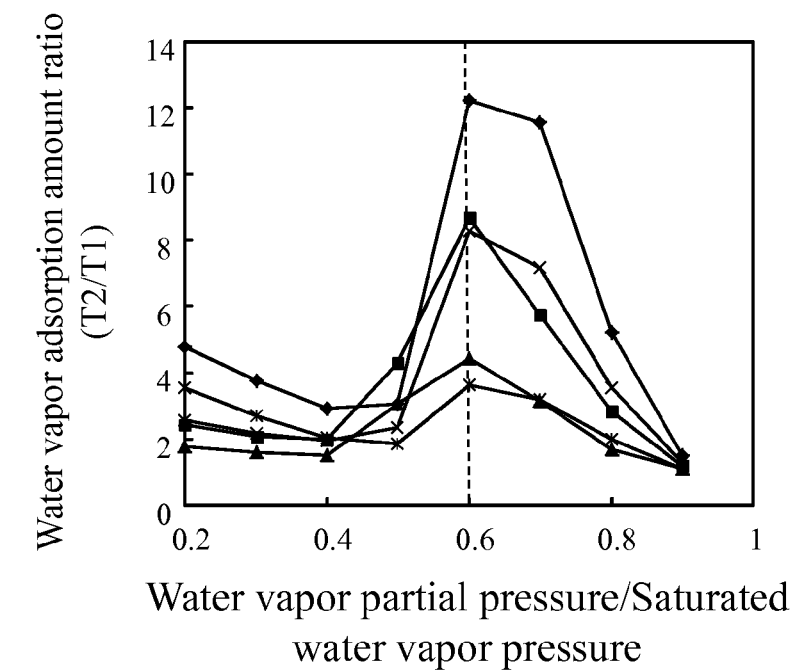

Then the present inventors focused on the following point. That is, as illustrated in FIG. 7(a), as the water vapor partial pressure is increased to the vicinity of the saturated water vapor pressure, water vapor adsorbed to the supported catalyst increases, and as the water vapor partial pressure is decreased from the vicinity of the saturated water vapor pressure, water vapor adsorbed to the supported catalyst desorbs and decreases. At this time, a hysteresis loop is drawn in the relationship between the water vapor partial pressure and the mass of adsorbed water (water vapor).

That is, the mass T1 of water vapor adsorbed to the supported catalyst when the water vapor partial pressure is increased and the mass T2 of water vapor adsorbed to the supported catalyst when the water vapor partial pressure is decreased are different values even at the same water vapor partial pressure. This is because water vapor (water) entering into meso-pores once and adsorbed to the surface of meso-pores is difficult to leave from the meso-pores, so that the mass of water vapor adsorbed to the supported catalyst when the water vapor partial pressure is decreased is larger than the mass of water vapor adsorbed to the supported catalyst when the water vapor partial pressure is increased even at the same water vapor partial pressure.

Especially as illustrated in FIG. 7(b), a difference between the mass T1 of water vapor adsorbed to supported catalyst when the water vapor partial pressure is increased to be 60% of the saturated water vapor pressure and the mass T2 of water vapor adsorbed to supported catalyst when the water vapor partial pressure is decreased to be 60% of the saturated water vapor pressure, which are at the same water vapor partial pressure, is smaller than that at other water vapor partial pressures. The mass of water (water vapor) adsorbed to the supported catalyst at the water vapor partial pressure that is 60% of the saturated water vapor pressure is therefore measured, whereby drainage performance of the supported catalyst in the excessively humidified state can be evaluated. FIG. 7(b) shows the values of T2/T1 for convenience to explain a difference in the amount of water vapor attached at the water vapor partial pressure that is 60% of the saturated water vapor pressure, and the following shows evaluation values of this drainage performance using values of T1/T2.

From this point of view, oxidation treatment in the present embodiment is performed to supported catalyst so that, let that T1 denotes the mass of water vapor adsorbed to the supported catalyst when the water vapor partial pressure is increased to be 60% of the saturated water vapor pressure and T2 denotes the mass of water vapor adsorbed to the supported catalyst when the water vapor partial pressure is decreased from the vicinity of the saturated water vapor pressure to be 60% of the saturated water vapor pressure, T1/T2≥0.15 holds.

In this embodiment, the surface of meso-pores is oxidized so that T1/T2≥0.15, whereby the size of meso-pores is enlarged (enlargement of pores) as illustrated in FIG. 6(b), whereby drainage performance of water adsorbed to the meso-pores can be increased. This allows water inside of the meso-pores to be drained easily even under excessively humidified atmosphere as illustrated in FIG. 6(d), so that oxygen gas becomes easily diffused from the inside of meso-pores toward the catalyst particles. As a result, deterioration of power-generation performance of the fuel cell can be suppressed even under excessively humidified atmosphere. T1/T2 is preferably 0.3 or less, and it may be difficult to perform oxidation treatment so as to obtain a value exceeding this value.

When such treatment is performed using nitric acid aqueous solution, for example, nitric acid aqueous solution having concentration of 0.1 mol/L or more is heated to be 60° C. or higher (preferably 95° C. or higher), and supported catalyst is preferably immersed in this nitric acid aqueous solution for 1 hour or longer. This allows the surface of meso-pores to be oxidized to have hydrophilic nature, and also can increase the drainage performance of the supported catalyst (support).

EXAMPLES

The following describes Examples according to the present invention.

Example 1-1

As shown in Table 1, a support made of mesoporous carbon was prepared. In this support, meso-pores had the size of 2 nm or more, which was prepared by the method illustrated in the embodiment as described above. Next, the support was heated under the heating condition at 1,700° C. in argon-gas environment for 2 hours.

Next, catalyst particles were supported at least inside of the support subjected to the heat treatment. Specifically, the support was diffused into pure water, to which nitric acid was added, a predetermined amount of diamminedenitroplatinum acid aqueous solution was added, and then ethanol was further added, followed by heating for reduction. In this way, platinum particles as catalyst particles were supported inside of the support made of mesoporous carbon. The amount of platinum particles supported was 30 mass % with reference to the supported catalyst supporting the platinum particles.

Next, the support supporting catalyst particles was added to ionomer (Nafion manufactured by DuPont) and solvent (water+alcohol), and the ionomer (Nafion manufactured by DuPont) and the support supporting platinum (supported catalyst) were mixed so that their mass ratio (hereinafter mixture ratio) was 1:1 (PC in Table 1 (i.e., mass of ionomer/mass of supported catalyst)=1.0) to prepare catalyst ink. Next, the thus obtained catalyst ink was applied on a substrate using an applicator, followed by vacuum drying, to prepare an electrode sheet. Then the electrode sheet was thermal-transferred onto an electrolyte membrane, whereby an electrode for fuel cell was prepared.

Examples 1-2, 1-3

Similarly to Example 1-1, electrodes for fuel cell were prepared. They were different from Example 1-1 in that their supports were heated under the condition at 1,900° C. and 2,100° C. in argon-gas environment in the step of heat treatment.

Examples 2-1 to 2-3

For Example 2-1 to 2-3, electrodes for fuel cell were prepared under the conditions corresponding to Examples 1-1 to 1-3, respectively. They were different from Examples 1-1 to 1-3 in that the duration from the addition of diamminedenitroplatinum acid aqueous solution to the reflux was shortened.

Comparative Examples 1-1 to 1-3

Similarly to Example 1-1, electrodes for fuel cell were prepared. Comparative Examples 1-1 to 1-3 were different from Example 1-1 in that the support used was commercially-available VulcanXC-72R (trademark) manufactured by Cabot corporation, heat treatment was performed under the heat treatment conditions shown in Table 1 (Comparative Example 1-1 was not heat-treated), and ionomer (Nafion manufactured by DuPont) and the support supporting platinum particles were mixed with the mixture ratios (PC) shown in Table 1.

Comparative Examples 2-1 to 2-7

Similarly to Example 1-1, electrodes for fuel cell were prepared. Comparative Examples 2-1 to 2-7 were different from Example 1-1 in that the support used was commercially-available KetchenEC300J (trademark) manufactured by Lion corporation, heat treatment was performed under the heat treatment conditions shown in Table 1 (Comparative Examples 2-1, 2-2 were not heat-treated), and ionomer and the support supporting platinum particles were mixed with the mixture ratios (PC) shown in Table 1 (mixture ratio was the same for Comparative Examples 2-2 and 2-7).

Comparative Examples 3-1 to 3-4

Similarly to Example 1-1, electrodes for fuel cell were prepared. Comparative Examples 3-1 to 3-4 were different from Example 1-1 in that the support used was commercially-available KetchenEC600JD (trademark) manufactured by Lion corporation, heat treatment was performed under the heat treatment conditions shown in Table 1 (Comparative Example 3-1 was not heat-treated), and ionomer and the support supporting platinum particles were mixed with the mixture ratios (PC) shown in Table 1. The supports used here had larger specific surface area of meso-pores than that of the support used in Comparative Examples 2-1 to 2-7.

Comparative Examples 4-1 to 4-3

Similarly to Example 1-1, electrodes for fuel cell were prepared. They were different from Example 1-1 in that no heat treatment was performed (not treated), and heating was performed under the heat treatment conditions at 1,300° C. and 1,500° C. in argon-gas environment, respectively.

Comparative Examples 5-1 to 5-3

Similarly to Example 2-1, electrodes for fuel cell were prepared. They were different from Example 2-1 in that no heat treatment was performed (not treated), and heating was performed under the heat treatment conditions at 1,300° C. and 1,500° C. in argon-gas environment, respectively.

<Measurement of Crystallite Diameter Lc>

For the supports before supporting platinum particles (after heat treatment) other than Comparative Examples 2-2, 2-5, and 2-7, their crystallite diameter Lc at the 002 plane was measured. Specifically, a powder-form electrode catalyst body was analyzed by powder X-ray diffractometry using CuKα ray, and, and a half width β (radian) of a diffraction peak at each crystal plane (002) was obtained from the obtained diffraction pattern. Then, the average L (nm) of crystallite diameter of the support was calculated based on the Scherrer's formula: $L=K\lambda/\beta \cos \theta$. Herein the constant K is form factor, $\lambda$, denotes the wavelength of X ray (Å), and $\theta$ denotes diffraction angle (°). Note here that the peak at 002 plane appearing around the $\theta$ diffraction angle of 26° originates from the stacking direction of the carbon hexagonal network structure, which depends on the thickness of a wall face making up meso-pores. For Examples 1-1 to 1-3 and Examples 2-1 to 2-3, their crystallite diameters Lc at the 002 plane were measured before and after the heat treatment, and these values were the same.

<Measurement of Half Width of G Band>

For the supports before supporting platinum particles (after heat treatment) other than Comparative Examples 2-2, 2-5, and 2-7, their half widths of G band were measured. Specifically, measurement was performed using NRS-1000 manufactured by JASCO Corporation as a measurement instrument, where exciting light was green laser (wavelength: 532 nm) and the laser power was 100 mV. Then, a detector CCD (−60° C.) was used, and the number of scans was two, the duration of exposure was 30 seconds, and a beam attenuator OD2 (beam attenuation ratio: 1/100) was used. Table 1 shows the result.

<Measurement of Specific Surface Area of Meso-Pores>

For the supports before supporting platinum particles (after heat treatment) other than Comparative Examples 2-2, 2-5, and 2-7, their specific surface area of meso-pores was measured. Specifically, specific surface area of meso-pores having the size of 2 to 10 nm in the support was measured. Specifically, the support underwent vacuum deaeration using a pretreatment instrument for adsorption measurement (BELPREP-vacII manufactured by Nippon-bel cooperation) at 150° C. for 8 hours. Next, an adsorption/desorption isothermal curve using nitrogen was obtained through the measurement by a constant volume method using an automatic specific surface area/pore size distribution measurement device (BELPREP-mini manufactured by Nippon-bel cooperation) as illustrated in FIG. 7(a).

Measurement was performed under the conditions such that adsorption temperature was at 77K, adsorbate was nitrogen, adsorbate cross-sectional area was 0.16 $nm^2$, and equilibrium waiting time was 500 seconds, where the equilibrium waiting time refers to the waiting time after the adsorption equilibrium state (the state where pressure change falls below a predetermined value during adsorption and desorption) is reached. Based on an adsorption curve obtained by letting a support adsorb nitrogen gas, analysis was made by the DH (Dollimore-Heal) method, and in the present example, it was confirmed that meso-pores had pore sizes in the range of 2 to 10 nm, and the surface areas formed by these pores (meso-pores) were used as the specific surface area of meso-pores by the DH method. Table 1 shows the result.

<Measurement of Decrease Rate of Pt Surface Area>

For each of the MEAs (electrolyte membrane-electrode assembly) including the electrodes for fuel cell of Examples 1-1 to 1-3, Comparative Examples 1-1 to 1-3, Comparative Example 2-1, Comparative Example 3-1, Comparative Example 4-1, and Comparative Example 4-3, electrochemical surface area (ECSA) found from the H adsorbed amount was found, and their decrease rate (%/h) was measured.

Table 1 shows the result. Specifically, the ECSA decrease rate (%/h), i.e., Pt surface area decrease rate (%/h) was measured in 0.1 N perchloric acid ($HClO_4$) aqueous solution and under the durability condition such that 1.5V vs. RHE and 1-hour holding were performed ten times. A smaller ECSA decrease rate (%/h) means more excellent durability.

<Measurement of Specific Activity>

For each of the MEAs (electrolyte membrane-electrode assembly) including the electrodes for fuel cell of Examples 1-1 to 1-3, Examples 2-1 to 2-3, Comparative Example 1-1, Comparative Examples 2-1 to 2-3 and 2-5 to 2-7, Comparative Examples 4-1 to 4-3, and Comparative Examples 5-1 to 5-3, their mass activity was measured. Table 1 shows the result. Specifically, the mass activity was calculated from Tafel plot of current measurements at the temperature of 80° C. and the humidity of 100%. The standardized specific activity shown in Table 1 was a value that was standardized by the mass activity of the MEA of Comparative Example 1.

<Measurement of Ionomer Coverage>

For all of the electrodes for fuel cell prepared by the above-stated methods, the coverage by ionomer of the total surface area of the entire catalyst particles supported on the support was measured. Hydrogen gas at the anode and nitrogen gas at the cathode were allowed to flow under the conditions of 100% RH (80° C.) and 20% RH (44° C.), and voltage was swept in the sweeping range of 0.1 to 1.0 V and the sweeping rate of 50 m/sec with reference to the reference electrode (RHE), and then hydrogen adsorption electric quantity was measured by cyclic voltammetry as illustrated in FIG. 2(b). While setting the voltage value for the analysis lower limit at 0.2 V and the voltage for the analysis upper limit at 0.4 to 0.6 V, the maximum value of current was used for the calculation of hydrogen adsorption electric quantity. Then, calculation was performed by (hydrogen adsorption electric quantity at 20% RH)/(hydrogen adsorption electric quantity at 100% RH)×100, whereby the coverage by ionomer of the total surface area of the entire catalyst particles supported on the support was measured. Table 1 shows the result.

TABLE 1

| | crystallite diameter Lc nm | G band half width $cm^{-1}$ | meso-pore specific surface area $m^2/g$ | ECSA decrease | I/C | heat treatment temperature | ionomer coverage % | standardized specific activity |
|---|---|---|---|---|---|---|---|---|
| comp. ex. 1-1 | 1.9 | 94 | 90 | 3.6 | 0.8 | not-treated | 96.2 | 1.0 |
| comp. ex. 1-2 | 4.7 | 53 | 67 | 1.3 | 0.8 | 2000° C. | 97.0 | — |
| comp. ex. 1-3 | 5.5 | 40 | 60 | 0.7 | 0.8 | 2500° C. | 99.4 | — |
| comp. ex. 2-1 | 1.8 | 81 | 431 | 3.7 | 0.8 | not-treated | 56.5 | 2.2 |
| comp. ex. 2-2 | — | — | — | — | 1.0 | not-treated | 67.7 | 2.2 |
| comp. ex. 2-3 | 1.9 | 80 | 286 | — | 0.8 | 1300° C. | 88.8 | 1.5 |
| comp. ex. 2-4 | 2.5 | 52 | 230 | — | 0.8 | 2000° C. | 94.0 | — |
| comp. ex. 2-5 | — | — | — | — | 0.5 | 2800° C. | 96.3 | 0.8 |
| comp. ex. 2-6 | 4.0 | 35 | 74 | — | 0.8 | 2800° C. | 100.0 | 0.7 |
| comp. ex. 2-7 | — | — | — | — | 1.0 | 2800° C. | 100.0 | 0.6 |
| comp. ex. 3-1 | 1.6 | 75 | 1060 | 3.9 | 0.8 | not-treated | 43.2 | — |
| comp. ex. 3-2 | 2.0 | 56 | 220 | — | 0.8 | 2000° C. | 85.0 | — |
| comp. ex. 3-3 | 2.2 | 40 | 167 | — | 0.8 | 2200° C. | 95.6 | — |
| comp. ex. 3-4 | 3.8 | 33 | 118 | — | 0.8 | 2800° C. | 96.9 | — |
| comp. ex. 4-1 | 1.1 | 79 | 1061 | 3.6 | 1.0 | not-treated | 27.8 | 2.8 |
| comp. ex. 4-2 | 1.2 | 78 | 1055 | — | 1.0 | 1300° C. | 30.5 | 2.7 |
| comp. ex. 4-3 | 1.1 | 74 | 1089 | 3.7 | 1.0 | 1500° C. | 37.3 | 2.8 |
| comp. ex. 5-1 | 1.1 | 79 | 1061 | — | 1.0 | not-treated | 64.6 | 2.8 |
| comp. ex. 5-2 | 1.2 | 78 | 1055 | — | 1.0 | 1300° C. | 64.0 | 2.9 |
| comp. ex. 5-3 | 1.1 | 74 | 1089 | — | 1.0 | 1500° C. | 65.1 | 2.7 |
| ex. 1-1 | 1.1 | 60 | 1024 | 3.6 | 1.0 | 1700° C. | 39.9 | 2.9 |
| ex. 1-2 | 1.0 | 56 | 1002 | 3.0 | 1.0 | 1900° C. | 42.3 | 3.0 |
| ex. 1-3 | 1.1 | 49 | 780 | 2.3 | 1.0 | 2100° C. | 44.2 | 2.9 |
| ex. 2-1 | 1.1 | 60 | 1024 | — | 1.0 | 1700° C. | 68.7 | 2.8 |
| ex. 2-2 | 1.0 | 56 | 1002 | — | 1.0 | 1900° C. | 68.4 | 2.6 |
| ex. 2-3 | 1.1 | 49 | 780 | — | 1.0 | 2100° C. | 71.2 | 2.5 |

Figure 8:
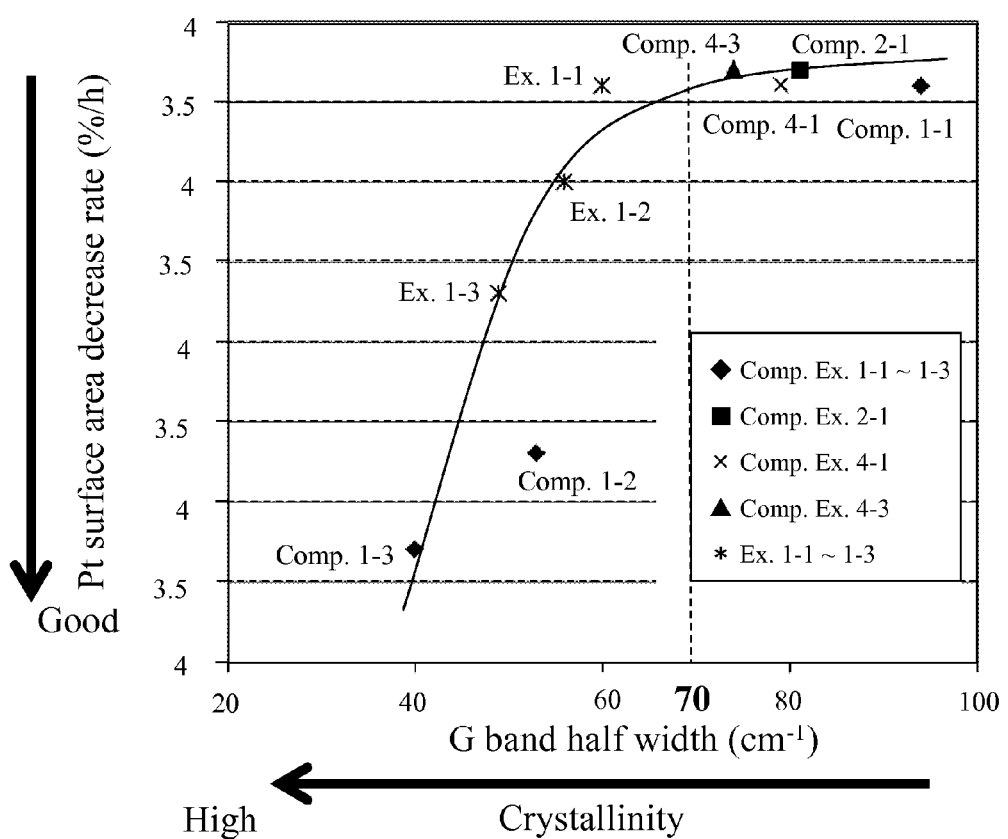
FIG. 8 illustrates the relationship between half width of G band and decrease rate of platinum surface area of Examples and Comparative Examples.
Figure 9:
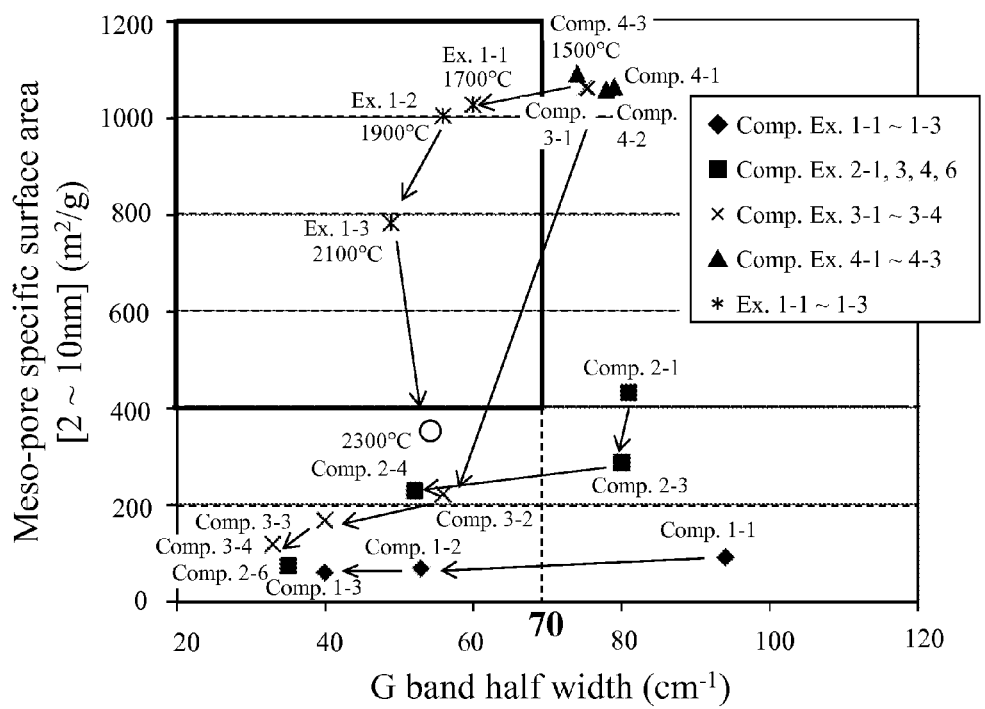
FIG. 9 illustrates the relationship between specific surface area of meso pores of the supports according to Examples and Comparative Examples and their half width of G band.

Based on these obtained values, FIG. 8 illustrates the relationship between the half width of G band of the supports and the platinum surface area decrease rate, and FIG. 9 illustrates the relationship between the specific surface area of meso-pores of the supports and the half width of G band. In FIG. 9, the result of the specific surface area of meso-pores and the half width of G band of the support of Example 1 that was heat-treated at 2,300° C. also was plotted (see the circle in the drawing).

Figure 10:
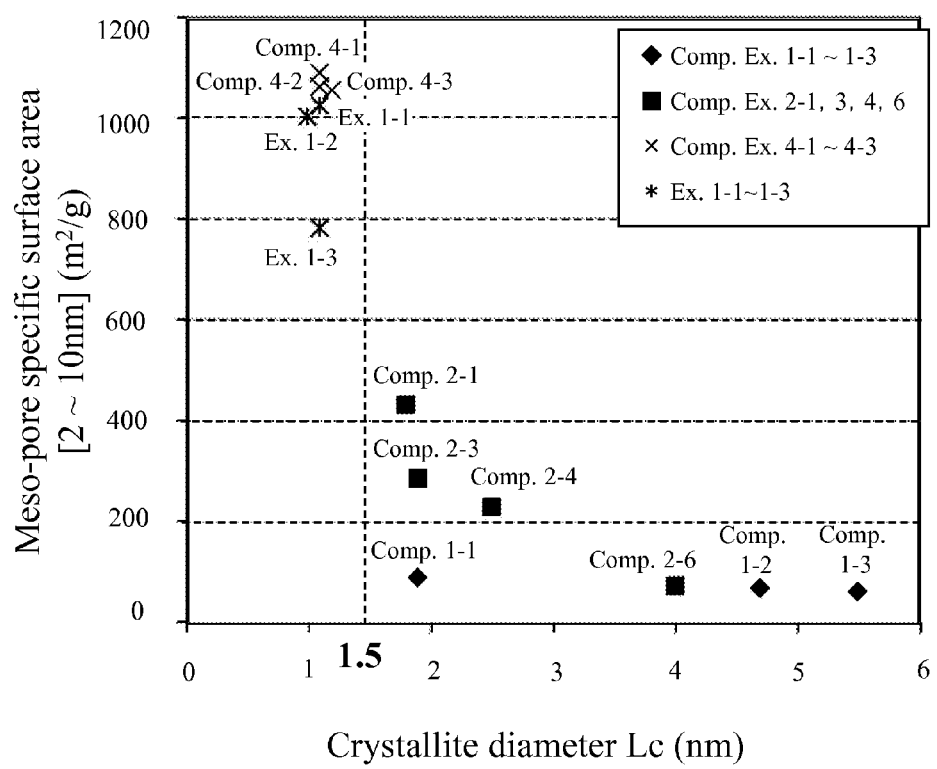
FIG. 10 illustrates the relationship between specific surface area of meso pores of the supports according to Examples and Comparative Examples and their crystallite diameter Lc at 002 plane.
Figure 11:
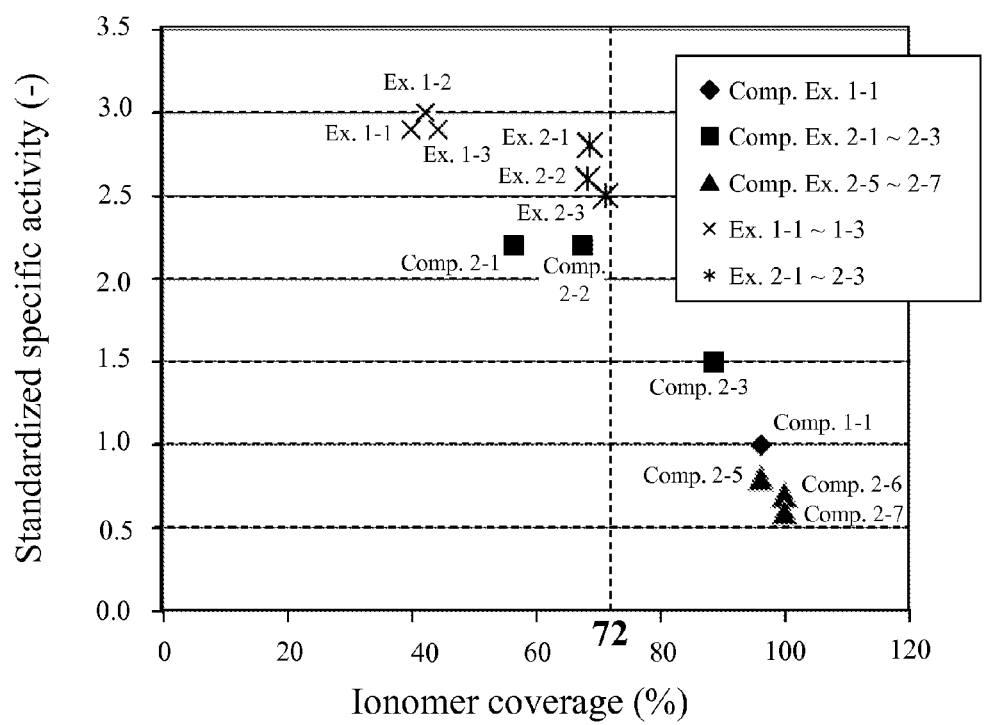
FIG. 11 illustrates the relationship between specific activity of electrodes for fuel cell according to Examples and Comparative Examples and their coverage by ionomer of the surface of platinum.
Figure 12:
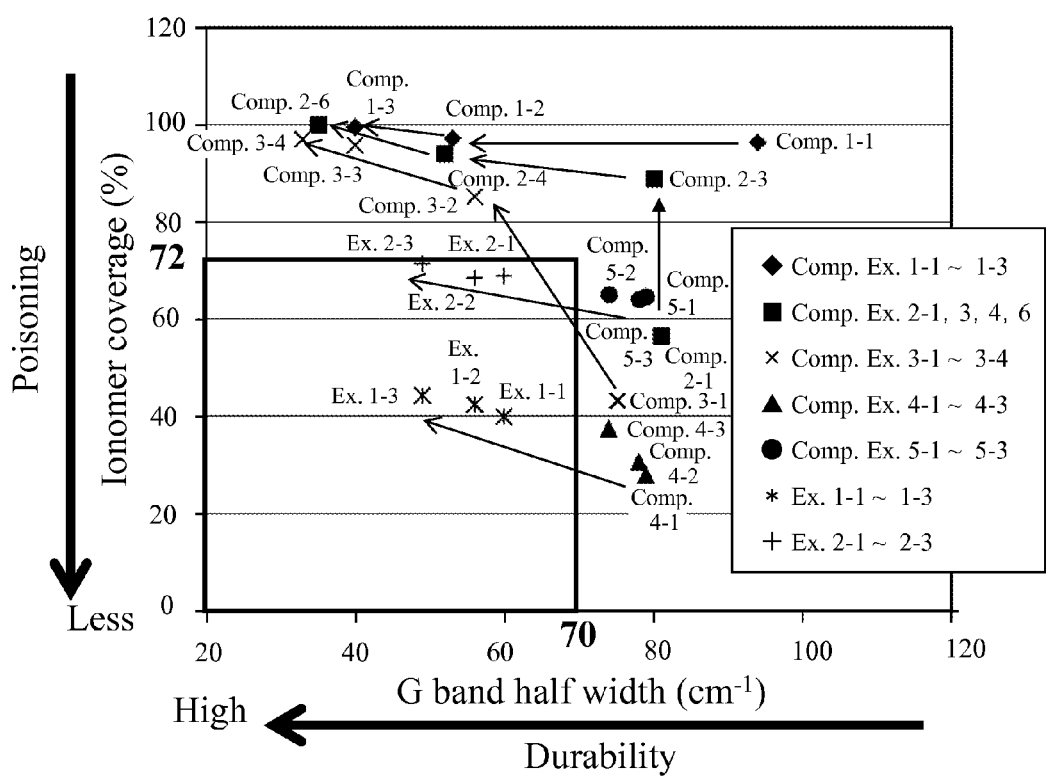
FIG. 12 illustrates the relationship between coverage by ionomer of the surface of platinum of electrodes for fuel cell according to Examples and Comparative Examples and their half width of G band of the supports.

FIG. 10 illustrates the relationship between the specific surface area of meso-pores of the supports and the crystallite diameter Lc at 002 plane. Then FIG. 11 illustrates the relationship between the specific activity of the electrodes for fuel cell and the coverage by ionomer on the platinum surface. FIG. 12 illustrates the relationship between the coverage by ionomer on the platinum surface of the electrodes for fuel cell of Examples and Comparative Examples and the half width of G band of supports.

As illustrated in FIG. 8, as the half width of G band decreases, the platinum surface area decrease rate also decreases. That is, it can be considered that this results from an increase in crystallinity of the supports because the half width of G band decreases. Especially, as the half width of G band of mesoporous carbon decreases below 70 cm$^{-1}$, the platinum surface area decrease rate also decreases.

As illustrated in FIG. 9, the specific surface area of meso-pores is decreased by increasing the temperature of heat treatment. It can be considered, however, that when heat treatment is performed to the supports in the range of 1,700° C. to 2,100° C. as in Examples 1-1 to 1-3, crystallinity of supports increases (half width of G band also decreases) and so platinum particles (catalyst particles) can be supported therein. On the other hand, in the case of Comparative Examples 2-1, 2-3, 2-4, 2-6 and Comparative Examples 3-1 to 3-4, presumably pores of the supports collapsed due to heating. In the case of Examples 1-1 to 1-3, since the pore wall defining meso-pores of the mesoporous carbon has a stacking configuration of a few graphene sheets, their specific surface area of meso-pores presumably did not decrease by heat treatment. As illustrated in FIG. 10, this is because supports made of mesoporous carbon whose crystallite diameter Lc at 002 plane is in the range of 1.5 nm or less as in Examples 1-1 to 1-3 will be free from collapsing of pores (meso-pores) of the mesoporous carbon even at the heat treatment at 1,700° C. or more and less than 2,300° C., and so the durability of mesoporous carbon can be increased.

As illustrated in FIG. 11, Examples 1-1 to 1-3 and Examples 2-1 to 2-3 had higher specific activity than others, and their ionomer coverage of the surface of platinum particles was 72% or less. Then as illustrated in FIG. 12, when heat treatment was performed to Examples 1-1 to 1-3 and Examples 2-1 to 2-3 under the temperature conditions as stated above, their half width of G band was 70 cm$^{-1}$ or less and their ionomer coverage was decreased successfully.

Figure 13:
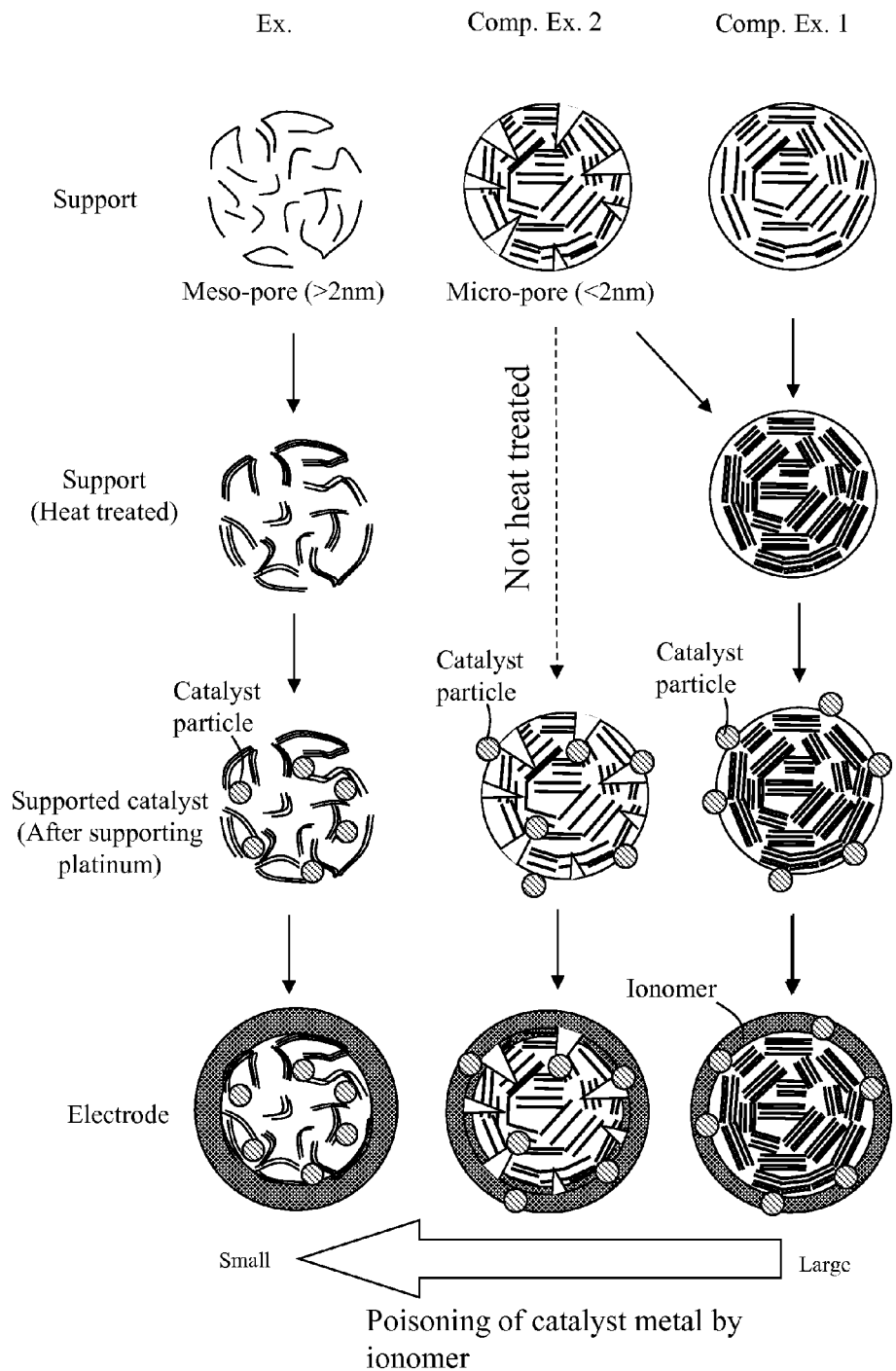
FIG. 13 schematically illustrates the state of the supports and the electrodes for fuel cell during the manufacturing process according to Example and Comparative Examples.

Referring to FIG. 13, the results as stated above are summarized below. In FIG. 13, Examples correspond to Examples 1-1 to 1-3, Comparative Example 1 corresponds to Comparative Examples 1-2 and 1-3 and Comparative Example 2 corresponds to Comparative Examples 2-2 to 2-7.

Herein it can be said that, when the support has less pores as in Comparative Example 1, the coverage by ionomer is high in spite of the heat treatment, and crystals are grown while keeping such high coverage by ionomer after the heat treatment as well.

On the other hand, even when the support has pores as in Comparative Example 2, if internal pores do not grow very much, the pores will collapse during heat treatment, and then crystallinity will grow. This results in high coverage by ionomer like Comparative Example 1 although its durability can be improved.

When the support as in Example has pores growing to the inside, and the pores are formed to have only a few stacking structure (i.e., mesoporous carbon having the crystallite diameter Lc at 002 plane of 1.5 nm or less), such a staking structure grows during heat treatment, which can suppress collapse of the pores. That is, it can be considered so that the crystallinity can be increased while keeping the structure of pores in the support.

Example 3

Similarly to Example 1-3, an electrode for fuel cell was prepared. This was different from Example 1-3 in that 30 mass % of catalyst particles were supported inside of mesoporous carbon to prepare supported catalyst, and then this was heat-treated in the inert gas atmosphere at 700° C. before applying ionomer for coating, which was then immersed in 0.5 mol/L of nitric acid aqueous solution heated to 90° C. for 20 hours for oxidation treatment.

Comparative Example 6

Similarly to Example 3, an electrode for fuel cell was prepared. This was different from Example 3 in that oxidation treatment was not performed. Note here that Comparative Example 6 is to be compared with Example 3, and is included in the scope of the present invention.

<Measurement of Power Generation Performance>

Figure 14:
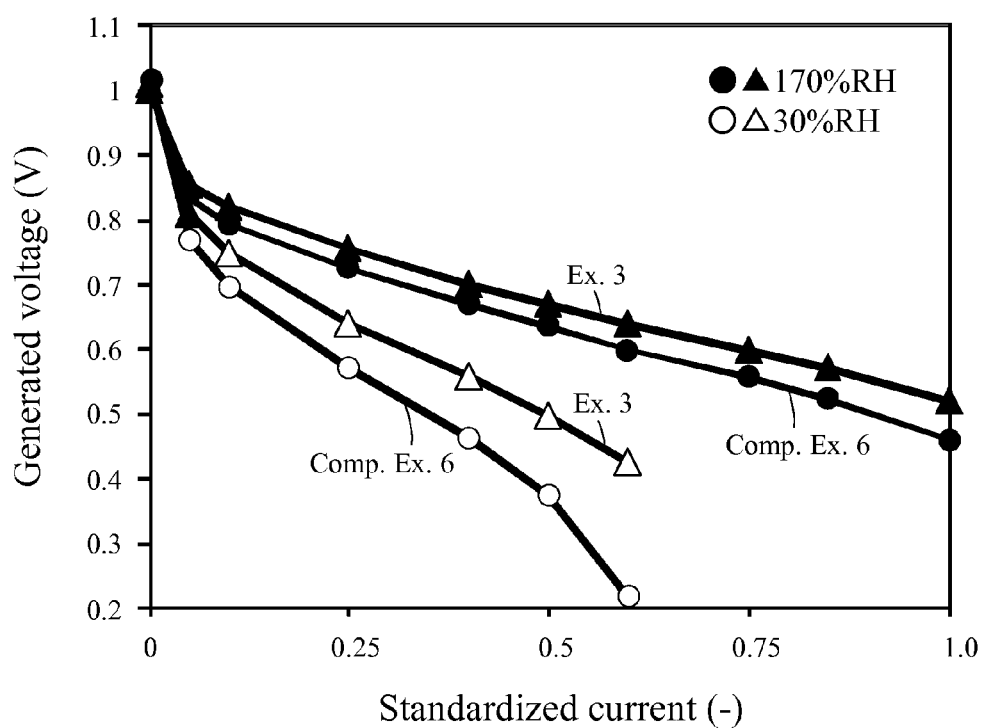
FIG. 14 illustrates power generation performance of the fuel cells according to Example 3 and Comparative Example 6.

Under the environment of 170% RH as excessively humidified environment and of 30% RH as low humidified environment, power generation performance (current voltage characteristics) of fuel cells including the electrodes for fuel cell according to Example 3 and Comparative Example 6 were measured. FIG. 14 illustrates the result. FIG. 14 illustrates the influences on the power generation performance from oxidation treatment. In FIG. 14, the current values on the horizontal axis are dimensionless quantity obtained by normalizing the maximum values of current as 1.

As illustrated in FIG. 14, when the electrode for fuel cell according to Example 3 was used, the power generation performance was improved in any case of the excessively humidified environment and the low humidified environment as compared with Comparative Example 6. It can be considered that, in the case of Example 3, the oxidation treatment suppressed diffusion resistance of protons or oxygen gas in any environment as illustrated in FIG. 6(c), (d) as stated above as compared with the case of Comparative Example 6.

<2. Confirmation of Hydrophilic Nature Due to Oxidation Treatment>

Examples 4-1 to 4-12

Similarly to Example 1-3, electrodes for fuel cell were prepared. Examples 4-1 to 4-12 were commonly different from Example 1-3 in that after supported catalyst was prepared, this was heat-treated in the inert gas atmosphere at 700° C. before applying ionomer for coating, which was then immersed in nitric acid aqueous solution under the conditions shown in Table 2 for oxidation treatment. For Examples 4-1 to 4-10, 30 mass % of catalyst particles were supported on mesoporous carbon, and for Examples 4-11 and 4-12, 50 mass % of catalyst particles were supported on mesoporous carbon. For Examples 4-1 to 4-12, heat treatment temperatures for the supports before supporting catalyst particles, for example, were the same as in Example 1-3.

Comparative Examples 7-1 to 7-5

Similarly to Example 4-1, electrodes for fuel cell were prepared. Comparative Example 7-1 was different from Example 4-1 in that the support was immersed in nitric acid aqueous solution under the condition shown in Table 2 for oxidation treatment. Comparative Examples 7-2 to 7-5 were different from Example 4-1 in that oxidation treatment was not performed, and Comparative Examples 7-2 to 7-4 were different in heat treatment temperature for the support before supporting catalyst particles (see Table 2).

TABLE 2

| | | oxidation treatment condition | | |
| --- | --- | --- | --- | --- |
| | heat treatment temperature (° C.) | concentration (mol/L) | treatment temperature (° C.) | treating time (hour) |
| ex. 4-1 | 2100 | 0.5 | 80 | 5 |
| ex. 4-2 | 2100 | 0.5 | 90 | 1 |
| ex. 4-3 | 2100 | 0.1 | 90 | 5 |
| ex. 4-4 | 2100 | 0.5 | 90 | 5 |
| ex. 4-5 | 2100 | 1 | 90 | 5 |
| ex. 4-6 | 2100 | 0.5 | 90 | 20 |
| ex. 4-7 | 2100 | 0.5 | 90 | 40 |
| ex. 4-8 | 2100 | 0.5 | 95 | 5 |
| ex. 4-9 | 2100 | 0.5 | 95 | 20 |
| ex. 4-10 | 2100 | 0.5 | 95 | 40 |
| ex. 4-11 | 2100 | 0.5 | 60 | 20 |
| ex. 4-12 | 2100 | 0.5 | 80 | 20 |
| comp. ex. 7-1 | 2100 | 0.5 | 40 | 5 |
| comp. ex. 7-2 | 1500 | | not treated | |
| comp. ex. 7-3 | 1700 | | not treated | |
| comp. ex. 7-4 | 1900 | | not treated | |
| comp. ex. 7-5 | 2100 | | not treated | |

<Measurement of Oxygen Content>

For Examples 4-1 to 4-12 and Comparative Examples 7-1 to 7-5, oxygen content per unit area contained in the surface of the support (supported catalyst) supporting catalyst particles before applying ionomer for coating was measured. Specifically each supported catalyst was vacuum-dried at 150° C. for 8 hours, the supported catalyst was molten in inert gas by impulse heating/melting using oxygen nitrogen analyzer (EMCA-920 manufactured by Horiba, Ltd.), and the amount of oxygen was measured by the NDIR detection method. Herein since most of the oxygen contained in the supported catalyst was included in the surface due to oxidation treatment, the measured amount of oxygen was divided by the BET specific surface area as stated above, whereby oxygen content per unit area contained in the surface of the supported catalyst was calculated.

<Measurement of Power Generation Performance Under Low Humidified Environment>

Figure 15:
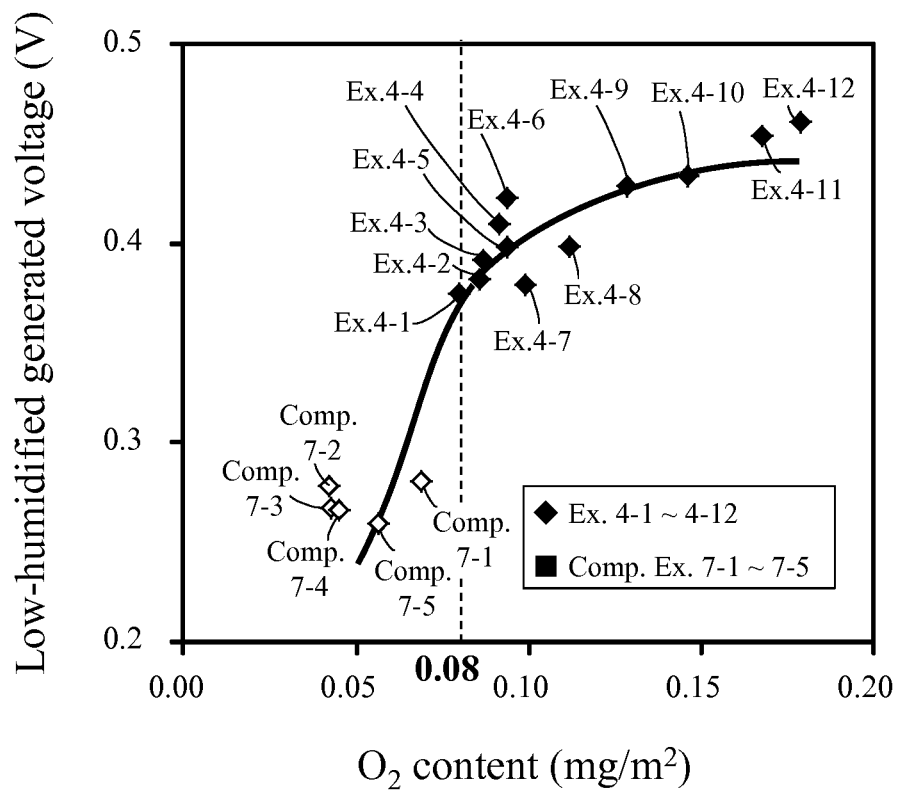
FIG. 15 illustrates the relationship between generated voltage under low humidified environment and the oxygen content per unit area contained in the surface of the supported catalysts when the electrodes for fuel cell according to Examples and Comparative Examples are used.

Under the environment of 30% RH as low humidified environment, power generation performance (current voltage characteristics) of fuel cells including the electrodes for fuel cell according to Examples 4-1 to 4-12 and Comparative Examples 7-1 to 7-5 were measured. FIG. 15 illustrates the result. FIG. 15 illustrates the relationship between generated voltage (at the time of current value of 1.2 A/cm$^2$) under the low humidified environment and the oxygen content per unit area contained in the surface of the support catalyst.

[Results and Consideration]

As illustrated in FIG. 15, the fuel cells according to Examples 4-1 to 4-12 had higher generated voltage than Comparative Examples 7-1 to 7-5. Presumably this is because the surface of meso-pores of the supported catalysts according to Examples 4-1 to 4-12 had more oxygen than Comparative Examples 7-1 to 7-5, and so had hydrophilic nature. As described in Examples 4-1 to 4-12, it can be said that, when the oxygen content per unit area contained in the surface of the supported catalyst is 0.08 mg/m$^2$ or more, deterioration of power-generation performance of the fuel cell can be suppressed under low humidified environment.

The fuel cell according to Comparative Example 7-1 had slightly higher generated voltage than those of Comparative Examples 7-2 to 7-5. It can be considered that this is because the surface of meso-pores of the supported catalyst had more hydrophilic nature because of oxidation treatment than those of Comparative Examples 7-2 to 7-5. Herein the oxygen content per unit area contained in the surface of the supported catalyst according to Example 4-12 was 0.18 mg/m$^2$.

Examples 5-1, 5-2, 6-1, and 6-2

Similarly to Example 4-1, electrodes for fuel cell were prepared. Examples 5-1, 5-2, 6-1 and 6-2 were different from Example 4-1 in that they were immersed in nitric acid aqueous solution under the conditions shown in Table 3 for oxidation treatment. They were different from Example 4-1 also in that, for Examples 5-1 and 5-2, 40 mass % of catalyst particles were supported on mesoporous carbon, and for Examples 6-1 and 6-2, 50 mass % of catalyst particles were supported on mesoporous carbon. For Examples 5-1, 5-2, 6-1 and 6-2, heat treatment temperatures for the supports before supporting catalyst particles, for example, were the same as in Example 1-3.

Examples 7-1 to 7-3

Similarly to Example 5-1, electrodes for fuel cell were prepared. Examples 7-1 to 7-3 were different from Example 5-1 in that 30 mass % of catalyst particles were supported on mesoporous carbon, and they were immersed in nitric acid aqueous solution under the conditions shown in Table 3 for oxidation treatment.

Comparative Examples 8-1, 8-2, 9-1 and 9-2

Similarly to Example 5-1, electrodes for fuel cell were prepared. Comparative Examples 8-1 and 9-1 were mainly different from Example 5-1 in that oxidation treatment was not performed as shown in Table 3, and Comparative Examples 8-2 and 9-2 were mainly different from Example 5-1 in that they were immersed in nitric acid aqueous solution under the conditions shown in Table 3 for oxidation treatment. Comparative Examples 9-1 and 9-2 were further different from Example 5-1 in that 50 mass % of catalyst particles were supported on mesoporous carbon. Comparative Examples 8-1 and 8-2 were the same as Example 5-1 in that 40 mass % of catalyst particles were supported on mesoporous carbon.

Comparative Examples 10-1 to 10-3

Similarly to Example 5-1, electrodes for fuel cell were prepared. Comparative Examples 10-1 and 10-2 were different from Example 5-1 in that oxidation treatment was not performed, and Comparative Example 10-1 was different in the heat treatment temperature for the support before supporting catalyst particles (see Table 3). Comparative Example 10-3 was different from Example 5-1 in that they were immersed in nitric acid aqueous solution under the conditions shown in Table 3 for oxidation treatment.

TABLE 3

| | | oxidation treatment condition | | |
|---|---|---|---|---|
| | heat treatment temperature (° C.) | concentration (mol/L) | treatment temperature (° C.) | treating time (hour) |
| ex. 5-1, 6-1 | 2100 | 0.5 | 60 | 20 |
| ex. 5-2, 6-2 | 2100 | 0.5 | 80 | 20 |
| ex. 7-1 | 2100 | 0.5 | 90 | 1 |
| ex. 7-2 | 2100 | 0.5 | 90 | 20 |
| ex. 7-3 | 2100 | 0.5 | 95 | 20 |
| comp. ex. 8-1, 9-1 | 2100 | | not-treated | |
| comp. ex. 8-2, 9-2 | 2100 | 0.5 | 40 | 20 |
| comp. ex. 10-1 | 1900 | | not-treated | |
| comp. ex. 10-2 | 2100 | | not-treated | |
| comp. ex. 10-3 | 2100 | 0.5 | 40 | 5 |

<Measurement of Adsorbed Amount of Water Vapor>

The supported catalysts where catalyst particles were supported on the support and before applying ionomer to the supported catalyst for coating of Examples 5-1, 5-2, 6-1, 6-2, and 7-1 to 7-3 and Comparative Examples 8-1, 8-2, 9-1, 9-2, and 10-1 to 10-3 underwent vacuum deaeration using a pretreatment instrument for adsorption measurement (BEL-PREP-vacII manufactured by Nippon-bel cooperation) at 150° C. for 8 hours. Next, an adsorption/desorption isothermal curve using water vapor was obtained through the measurement by a constant volume method using a high-precision vapor adsorption measurement instrument (BEL-PREP-aqua3 manufactured by Nippon-bel cooperation) as illustrated in FIG. 7(a).

Measurement was performed under the conditions such that adsorption temperature was at 323.15K, adsorbate was pure water, saturated water vapor pressure was 12.344 kPa, adsorbate cross-sectional area was 0.12 nm$^2$, equilibrium waiting time was 500 seconds, and molecular weight of adsorbate was 18.020, where the equilibrium waiting time refers to the waiting time after the adsorption equilibrium state (the state where pressure change falls below a predetermined value during adsorption and desorption) is reached.

Based on the thus obtained adsorption/desorption isothermal curve by water vapor, the mass T1 of water vapor adsorbed to the supported catalyst when the water vapor partial pressure is increased to be 60% of the saturated water vapor pressure and the mass T2 of water vapor adsorbed to the supported catalyst when the water vapor partial pressure is decreased from the vicinity of the saturated water vapor pressure to be 60% of the saturated water vapor pressure were found, and the adsorbed amount ratio T1/T2 was calculated.

<Measurement of Power Generation Performance Under Excessively Humidified Environment>

Figure 16:
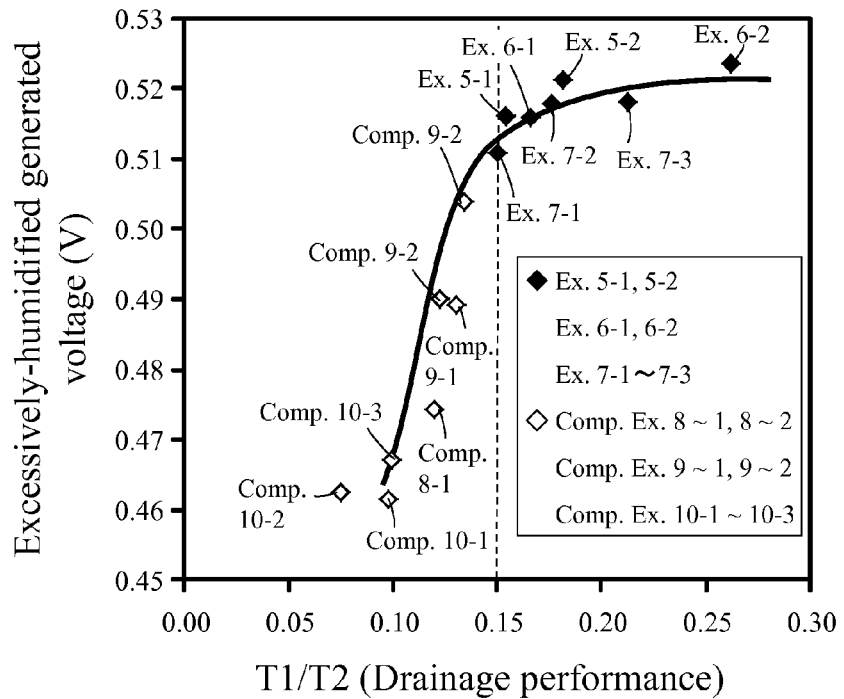
FIG. 16 illustrates the relationship between generated voltage under excessively-humidified environment and T1/T2 when the electrodes for fuel cell according to Examples and Comparative Examples are used.
Figure 17:
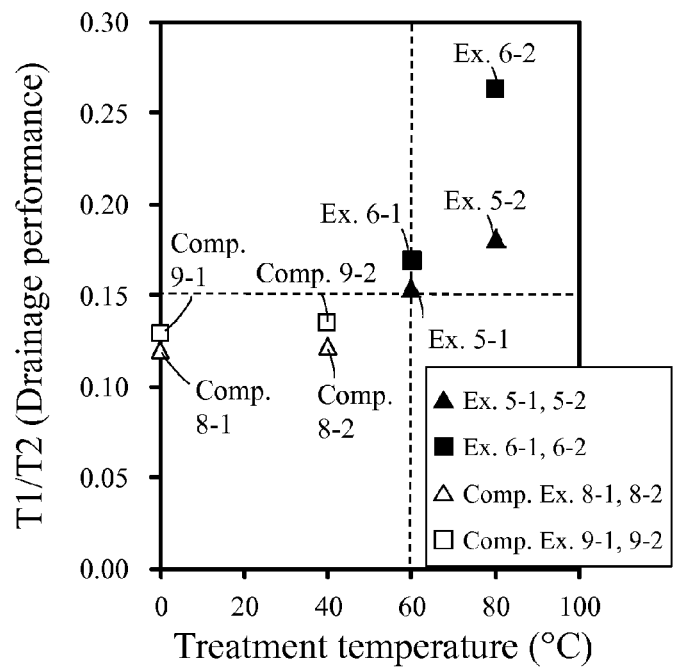
FIG. 17 illustrates the relationship between the treatment temperature for oxidation treatment in the manufacturing methods of electrodes for fuel cell according to Examples and Comparative Examples and T1/T2.

Under the environment of 170% RH as excessively humidified environment, power generation performance (current voltage characteristics) of fuel cells including the electrodes for fuel cell according to Examples 5-1, 5-2, 6-1, 6-2, and 7-1 to 7-3 and Comparative Examples 8-1, 8-2, 9-1, 9-2, and 10-1 to 10-3 was measured. FIG. 16 illustrates the result. FIG. 16 illustrates the relationship between generated voltage (at the time of current value of 2.0 A/cm$^2$) under the low humidified environment and T1/T2. FIG. 17 illustrates the relationship between the treatment temperature for oxidation treatment and T1/T2.

[Results and Consideration]

As illustrated in FIG. 16, the fuel cells according to Examples 5-1, 5-2, 6-1, 6-2, and 7-1 to 7-3 had higher generated voltage than Comparative Examples 8-1, 8-2, 9-1, 9-2, and 10-1 to 10-3. It can be considered that this is because Examples had higher drainage performance of meso-pores than Comparative Examples under the excessively humidified environment. Let that T1 denotes the mass of water vapor adsorbed to the supported catalyst when the water vapor partial pressure is increased to be 60% of the saturated water vapor pressure and T2 denotes the mass of water vapor adsorbed to the supported catalyst when the water vapor partial pressure is decreased from the vicinity of the saturated water vapor pressure to be 60% of the saturated water vapor pressure, it can be considered that, when the relationship of T1/T2≥0.15 is satisfied, deterioration of power-generation performance can be suppressed even under the excessively humidified environment. T1/T2 of Example 6-2 was 0.27.

As illustrated in FIG. 17, oxidation treatment may be performed so as to bring at least the surface of meso-pores of mesoporous carbon into contact with the nitric acid aqueous solution heated to be 60° C. or higher for 1 hour or more, and then the relationship of T1/T2≥0.15 will be satisfied, and so it can be considered that deterioration of power-generation performance can be suppressed even under the excessively humidified environment.

Examples 8-1 to 8-4, Examples 9-1 to 9-3

Similarly to Example 1-3, electrodes for fuel cell were prepared. Examples 8-1 to 8-4 and Examples 9-1 to 9-3 were different from Example 1-3 in that 30 mass % of catalyst particles were supported inside of mesoporous carbon to prepare supported catalyst, and then this was heat-treated in the inert gas atmosphere at 700° C. before applying ionomer for coating, which then underwent oxidation treatment shown in Table 4.

For Examples 8-1 to 8-4, the concentration of nitric acid aqueous solution and the treatment temperature were the same (0.5 mol, 90° C.) among the oxidation treatment conditions, but the treating time was changed. For Examples 9-1 to 9-3, the treatment temperature and the treating time were the same (90° C., 5 hours) among the oxidation treatment conditions, but the concentration of nitric acid aqueous solution was changed. For Example 8-2 and Example 9-2, the same condition was used.

Figure 18:
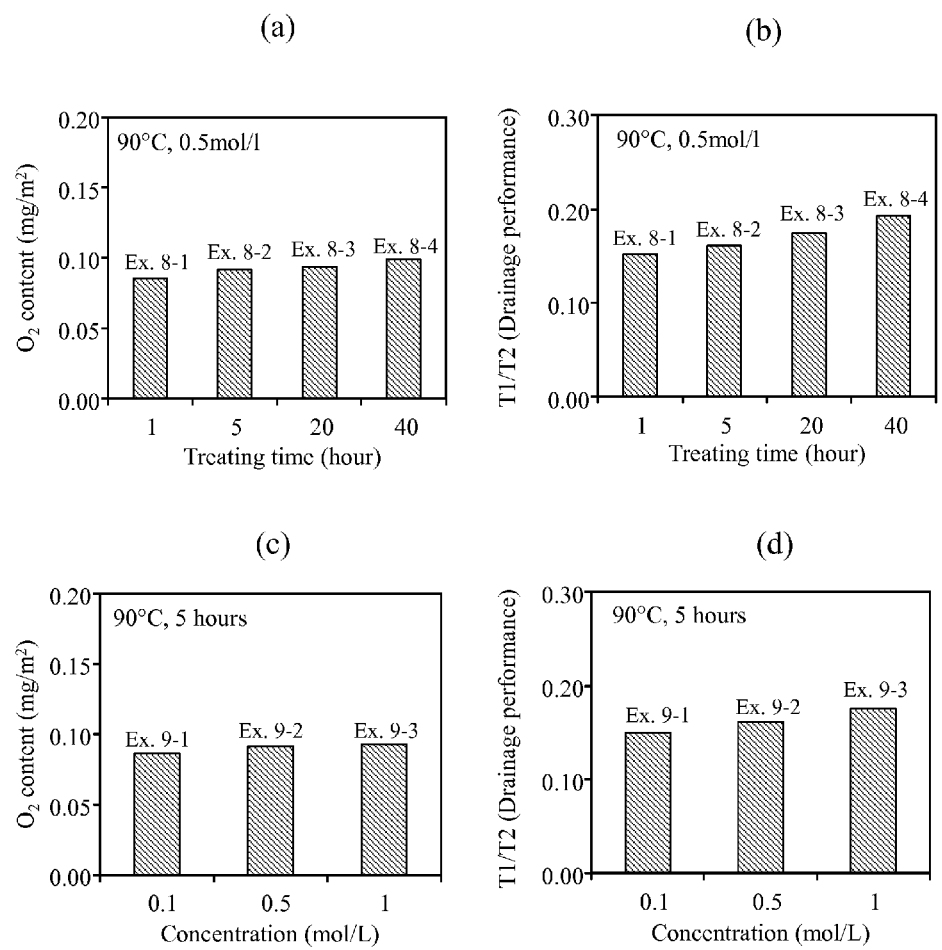
FIG. 18(a) illustrates the relationship between the treating time and the oxygen content, (b) illustrates the relationship between the treating time and the drainage performance, (c) illustrates the relationship between the concentration of nitric acid aqueous solution and the oxygen content, and (d) illustrates the relationship between the concentration of nitric acid aqueous solution and the drainage performance.

For Examples 8-1 to 8-4 and Examples 9-1 to 9-3, oxygen content per unit area contained in the surface of the support (supported catalyst) supporting catalyst particles before applying ionomer for coating, and the adsorption amount ratio T1/T2 were calculated. FIG. 18 illustrates the result. FIG. 18(a) illustrates the relationship between the treating time and the oxygen content, (b) illustrates the relationship between the treating time and the drainage performance, (c) illustrates the relationship between the concentration of nitric acid aqueous solution and the oxygen content, and (d) illustrates the relationship between the concentration of nitric acid aqueous solution and the drainage performance.

TABLE 4

| | heat treatment temperature (° C.) | oxidation treatment condition | | |
|---|---|---|---|---|
| | | concentration (mol/L) | treatment temperature (° C.) | treating time (hour) |
| ex. 8-1 | 2100 | 0.5 | 90 | 1 |
| ex. 8-2 | 2100 | 0.5 | 90 | 5 |
| ex. 8-3 | 2100 | 0.5 | 90 | 20 |
| ex. 8-4 | 2100 | 0.5 | 90 | 40 |
| ex. 9-1 | 2100 | 0.1 | 90 | 5 |
| ex. 9-2 | 2100 | 0.5 | 90 | 5 |
| ex. 9-3 | 2100 | 1.0 | 90 | 5 |

[Results and Consideration]

It can be considered that changing the treating time for oxidation treatment as illustrated in FIG. 18(*a*), (*b*) and changing the concentration of nitric acid aqueous solution as illustrated in FIG. 18(*c*), (*d*) do not lead to a change in the oxygen content and T1/T2 a lot, and among the oxidation treatment conditions, the treatment temperature greatly contributes to a change in the oxygen content and in T1/T2. Then it can be considered that at least the surface of meso-pores of mesoporous carbon is brought into contact with the nitric acid aqueous solution of the concentration of 0.1 mol/L or more that is heated to be 60° C. or higher for 1 hour or more, whereby the oxygen content per unit area contained in the surface of the supported catalyst where catalyst particles are supported on the support will be 0.08 mg/m$^2$ or more and the relationship of T1/T2≥0.15 will be satisfied.

The invention claimed is:

1. A method for manufacturing an electrode for a fuel cell, comprising:
    performing a heat treatment of a support made of a mesoporous carbon having a crystallite diameter Lc at the 002 plane that is 1.5 nm or less, at 1,700° C. or more and less than 2,300° C.;
    supporting catalyst particles at least inside of the support subjected to the heat treatment; and
    applying an ionomer to the support supporting the catalyst particles for coating,
    further comprising, after supporting the catalyst particles and before applying the ionomer for coating, performing an oxidation treatment of at least a surface of the meso-pores of the mesoporous carbon of the support so that an oxygen content per unit area contained in a surface of supported catalyst where the catalyst particles are supported on the support is 0.08 mg/m$^2$ or more.

2. The method for manufacturing an electrode for a fuel cell according to claim 1, wherein the heat treatment is performed so that the meso-pores having a size of 2 to 10 nm in the support have a specific surface area of the meso-pores that is 400 m$^2$/g or more.

3. The method for manufacturing an electrode for a fuel cell according to claim 1, wherein, when the supported catalyst subjected to the oxidation treatment is placed under vacuum environment, and when water vapor partial pressure is increased to a vicinity of a saturated water vapor pressure so as to let water vapor adsorbed to the supported catalyst, and when water vapor partial pressure is decreased from a vicinity of the saturated water vapor pressure while letting water vapor adsorbed to the supported catalyst so as to let water vapor adsorbed to the supported catalyst desorb,
    let that T1 denotes mass of water vapor adsorbed to the supported catalyst when the water vapor partial pressure is increased to be 60% of the saturated water vapor pressure and T2 denotes mass of water vapor adsorbed to the supported catalyst when the water vapor partial pressure is decreased to be 60% of the saturated water vapor pressure, the oxidation treatment is performed to the supported catalyst so that a relationship of T1/T2≥0.15 is satisfied.

4. The method for manufacturing an electrode for a fuel cell according to claim 1, wherein, in the oxidation treatment, nitric acid aqueous solution that is 0.1 mol/L or more and is heated to be 60° C. or higher is brought into contact with at least the surface of the meso-pores of the mesoporous carbon for 1 hour or more.

* * * * *